(12) United States Patent
Itoh

(10) Patent No.: US 7,525,737 B2
(45) Date of Patent: Apr. 28, 2009

(54) ZOOM LENS AND IMAGE PICKUP APPARATUS HAVING SAME

(75) Inventor: Yoshinori Itoh, Shimotsuke (JP)

(73) Assignee: Canon Kabushiki Kaisha, Tokyo (JP)

( * ) Notice: Subject to any disclaimer, the term of this patent is extended or adjusted under 35 U.S.C. 154(b) by 281 days.

(21) Appl. No.: 11/683,105

(22) Filed: Mar. 7, 2007

(65) Prior Publication Data

US 2007/0242368 A1 Oct. 18, 2007

(30) Foreign Application Priority Data

Mar. 30, 2006 (JP) ............... 2006-094283

(51) Int. Cl.
*G02B 15/14* (2006.01)
(52) U.S. Cl. ...................... 359/687; 359/686
(58) Field of Classification Search ............. 359/686, 359/687
See application file for complete search history.

(56) References Cited

U.S. PATENT DOCUMENTS

| | | | |
|---|---|---|---|
| 4,969,721 A * | 11/1990 | Mihara | ................ 359/687 |
| 6,462,886 B1 | 10/2002 | Hagimori | |
| 6,721,105 B2 | 4/2004 | Ohtake et al. | |
| 6,751,030 B2 | 6/2004 | Suruwatari | |
| 6,975,461 B2 | 12/2005 | Eguchi | |
| 7,061,686 B2 | 6/2006 | Ohtake | |

FOREIGN PATENT DOCUMENTS

| | | |
|---|---|---|
| CN | 1424613 A | 6/2003 |
| CN | 1467530 A | 1/2004 |
| CN | 1512211 A | 7/2004 |
| JP | 03-296706 | 12/1991 |
| JP | 07-177926 | 7/1995 |
| JP | 2001-350092 | 12/2001 |
| JP | 2004-094233 | 3/2004 |

OTHER PUBLICATIONS

Translation of Notice of First Office Action concerning appln 200710089813.2 dated Sep. 19, 2008.

* cited by examiner

*Primary Examiner*—William C Choi
(74) *Attorney, Agent, or Firm*—Locke Lord Bissell & Liddell LLP

(57) ABSTRACT

A zoom lens comprises a first positive lens unit, a second negative lens unit, a third positive lens unit, and a fourth positive lens unit, the lens units being arranged in order from the object side to the image side. The position of the first lens unit at the telephoto end is closer to the object side than the position of the first lens unit at the wide angle end. The lens units move in such a way that the distance between the first and the second lens units at the telephoto end is larger than that at the wide angle end, the distance between the second and the third lens units at the telephoto end is smaller than that at the wide angle end, and the distance between the third and the fourth lens units at the telephoto end is larger than that at the wide angle end.

10 Claims, 19 Drawing Sheets

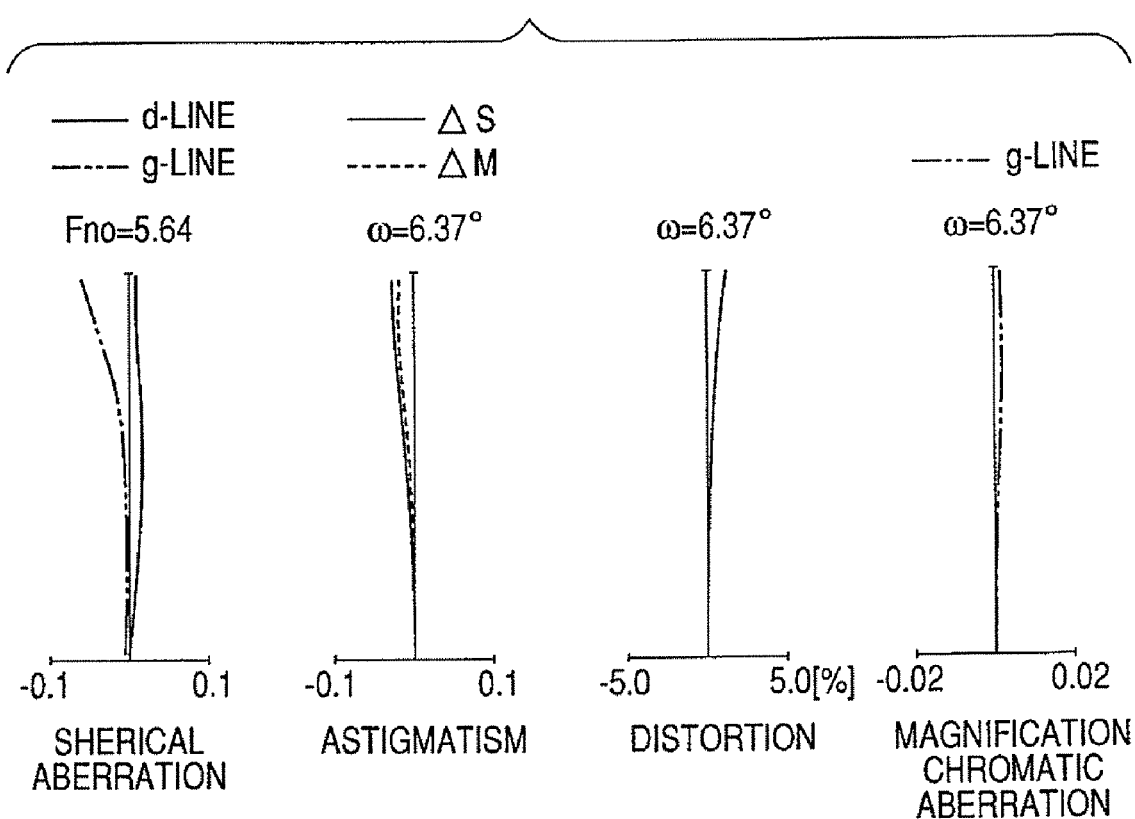

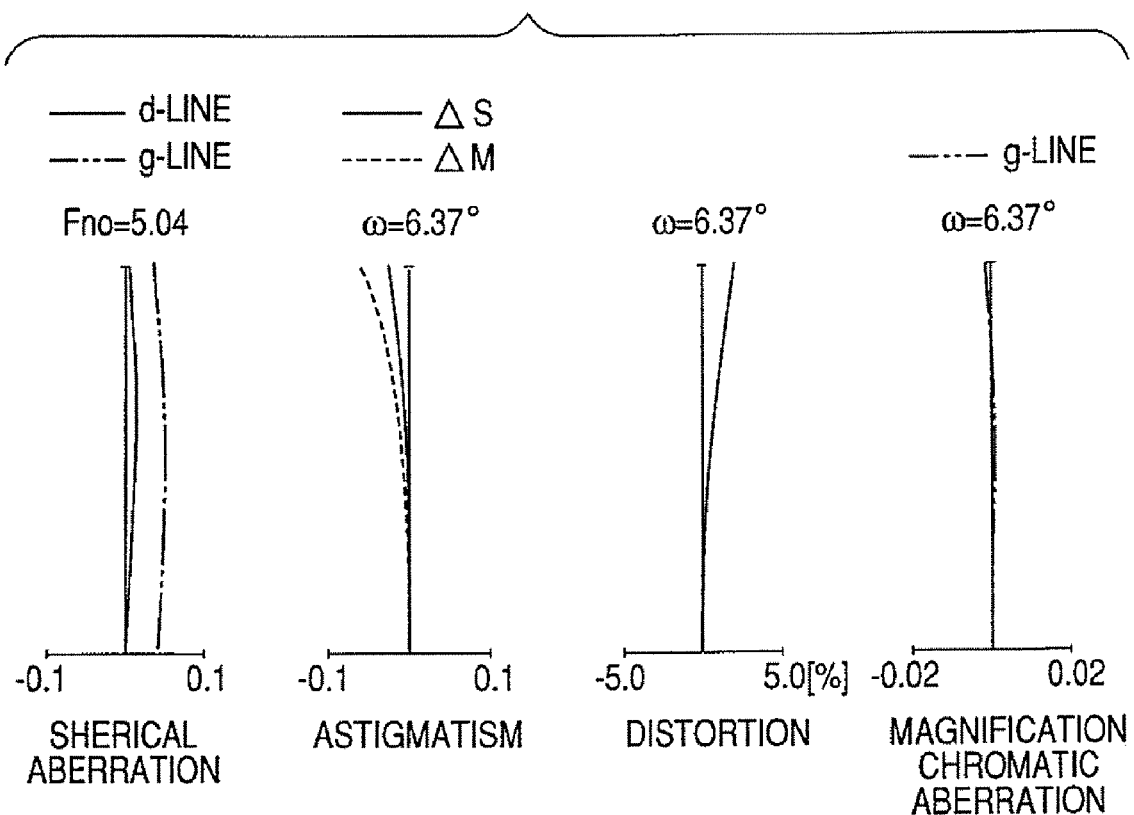

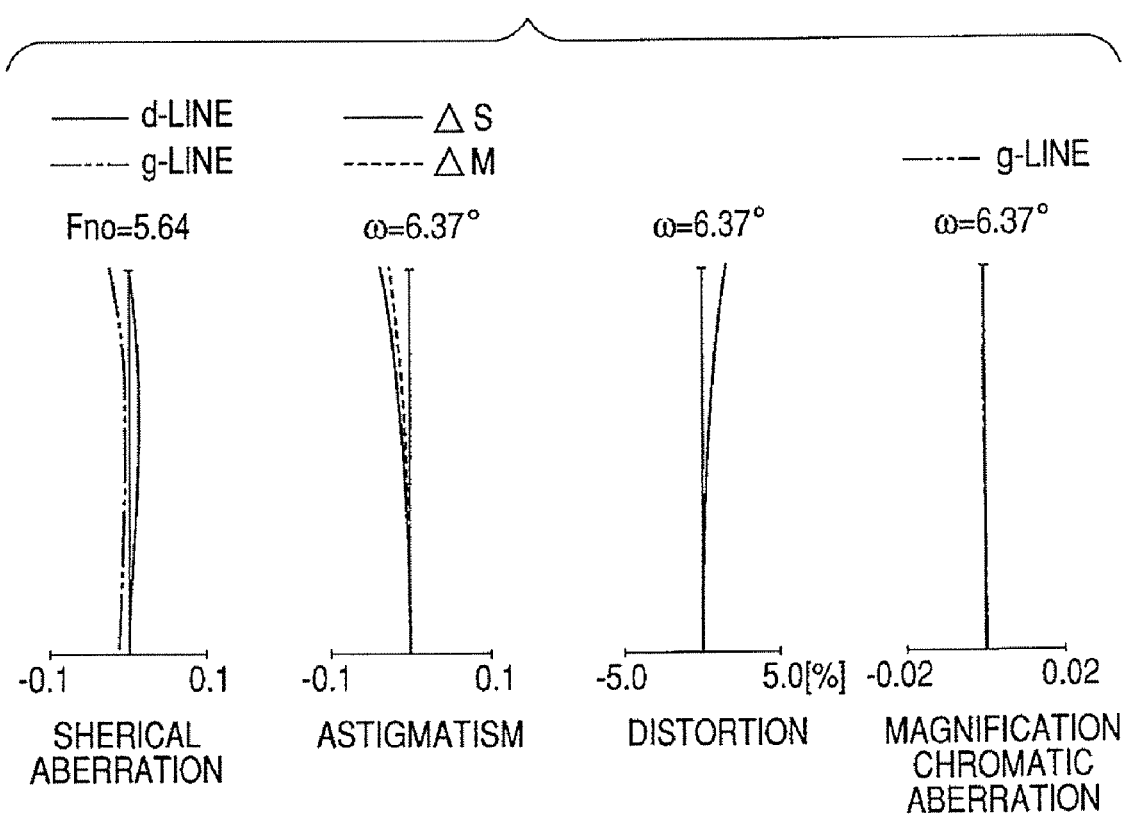

ZOOM LENS AND IMAGE PICKUP APPARATUS HAVING SAME

BACKGROUND OF THE INVENTION

1. Field of the Invention

The present invention relates to a zoom lens that is suitably used in a video camera, a film camera, a broadcasting camera, a digital still camera and the like and to an image pickup apparatus equipped with such a zoom lens.

2. Description of the Related Art

In recent years, size reductions and improvements in functionality have been achieved in image pickup apparatuses using a solid state image pickup element such as video cameras, digital still cameras, broadcasting cameras and still cameras using a film.

Along with this, it is desired that a taking optical system used in such an image pickup apparatus is required to be a compact zoom lens that is short in the entire length and has a high zoom ratio.

A compact, high zoom-ratio zoom lens composed of four lens units respectively having a positive refractive power, negative refractive power, positive refractive power and positive refractive power in the mentioned order from the object side to the image side has been known (see Japanese Patent Application Laid-Open No. H03-296706, U.S. Pat. No. 6,975,461 and Japanese Patent Application Laid-Open No. 2004-94233). In this zoom lens, zooming is effected by moving the lens units.

In a known four-lens-unit zoom lens having the above described configuration, the second lens unit is composed of three negative lenses and one positive lens (see Japanese Patent Application Laid-Open No. H07-177926). In another known four-lens-unit zoom lens, the second lens unit is composed of five lenses (see U.S. Pat. No. 6,462,886 and Japanese Patent Application Laid-Open No. 2000-368338).

In recent years, image pickup apparatuses have been made smaller, and accordingly a reduction in the size of the zoom lens is highly desired. In particular, zoom lenses used in image pickup apparatuses are required to be made smaller in the size of the entire lens system while having a predetermined zoom ratio and having satisfactory optical performance throughout the zoom range.

Generally speaking, the length of each lens unit that constitutes a zoom lens along the optical axis increases with an increase in the number of the lenses in the lens unit.

In addition, when the movement amount of each lens unit in zooming and focusing is large, the entire length of the zoom lens becomes long, which makes it difficult to make the lens small.

To reduce the size of a zoom lens and to increase the zoom ratio thereof, it is necessary to appropriately design movement conditions of each lens unit in zooming, the refractive power of each lens unit, and the lens configuration of each lens unit. For example, when it comes to reduction in the size of a zoom lens, increasing the refractive power of each lens unit leads to a decrease in the movement amount of each lens unit, whereby the entire length of the lens system can be made smaller. However, if the refractive power of each lens unit is simply increased, variations in aberrations upon zooming become so large that it becomes difficult to correct the aberrations satisfactorily.

As will be seen from the above, size reduction and excellent optical performance are generally contrary to each other, and it is a significant challenge in designing a zoom lens to achieve both size reduction and excellent optical performance.

SUMMARY OF THE INVENTION

An object of the present invention is to provide a zoom lens having a high zoom ratio and excellent optical performance throughout its zoom range while having a simple lens configuration and being compact in size.

A zoom lens according to the present invention has a first lens unit having a positive refractive power, a second lens unit having a negative refractive power, a third lens unit having a positive refractive power, and a fourth lens unit having a positive refractive power, the lens units being arranged in the mentioned order from the object side to the image side, and the position of the first lens unit at the telephoto end being closer to the object side than the position of the first lens unit at the wide angle end. The lens units moves in such a way that the distance between the first lens unit and the second lens unit at the telephoto end is larger than that at the wide angle end, the distance between the second lens unit and the third lens unit at the telephoto end is smaller than that at the wide angle end, and the distance between the third lens unit and the fourth lens unit at the telephoto end is larger than that at the wide angle end. In this zoom lens, the first lens unit has two or less lenses including a positive lens, and the second lens unit includes a negative lens, a compound lens made of two optical members having refractive powers of opposite signs, and a positive lens arranged in the mentioned order from the object side to the image side.

Further features of the present invention will become apparent from the following description of exemplary embodiments with reference to the attached drawings.

BRIEF DESCRIPTION OF THE DRAWINGS

FIG. 4C illustrates aberrations of the zoom lens according to the second embodiment at the telephoto end position.

FIG. 8C illustrates aberrations of the zoom lens according to the fourth embodiment at the telephoto end position.

FIG. 10C illustrates aberrations of the zoom lens according to the fifth embodiment at the telephoto end position.

DESCRIPTION OF THE EMBODIMENTS

Figure 1A:
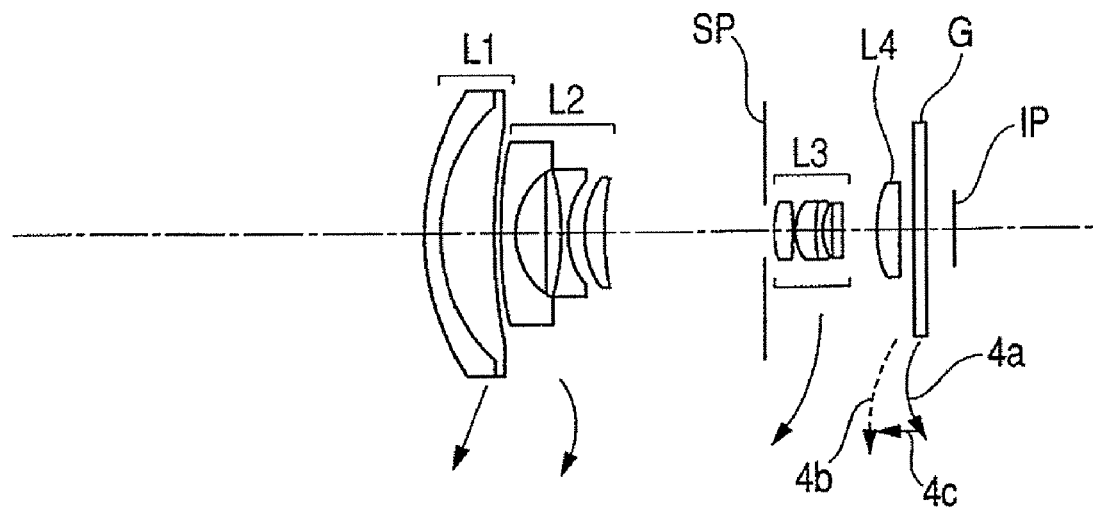
FIGS. 1A, 1B and 1C are cross sectional views illustrating the lens configuration of a zoom lens according to a first embodiment.

A zoom lens according to an embodiment of the present invention has a first lens unit having a positive refractive power, a second lens unit having a negative refractive power, a third lens unit having a positive refractive power and a fourth lens unit having a positive refractive power, the first to fourth lens units being arranged in the mentioned order from the object side to the image side. In this zoom lens, the position of the first lens unit at the telephoto end (i.e. at the telephoto end of the zoom range) is closer to the object side than the position of the first lens unit at the wide angle end (i.e. at the wide angle end of the zoom range). In addition, the lens units are moved in zooming in such a way that the distance between the first lens unit and the second lens unit is larger at the telephoto end than at the wide angle end, the distance between the second lens unit and the third lens unit is smaller at the telephoto end than at the wide angle end, and the distance between the third lens unit and the fourth lens unit is larger at the telephoto end than at the wide angle end. In other words, the distance between the first lens unit and the second lens unit at the telephoto end is larger than the distance between the first lens unit and the second lens unit at the wide angle end. Furthermore, the distance between the second lens unit and the third lens unit at the telephoto end is smaller than the distance between the second lens unit and the third lens unit at the wide angle end. Still further, the distance between the third lens unit and the fourth lens unit at the telephoto end is larger than the distance between the third lens unit and the fourth lens unit at the wide angle end. The aforementioned first lens unit consists of two or less lenses including a positive lens, and the second lens unit includes a negative lens, a compound lens made of two optical members having refractive powers of opposite signs, and a positive lens arranged in the mentioned order from the object side to the image side. Here, although the first lens unit consists of two or less lenses including a positive lens as mentioned above, an element, e.g., a filter, aperture stop, other than an optical element such as a lens having an optical power can be added. Please note that in the present Specification, the use of wording "consist of A and B" means that an element as a lens having an optical power is not included other than the elements of A and B. In addition, the term of "lens" or "lens element" in the Specification includes not only any of optical elements having optical power but also a diffraction gratings having a diffraction function or light condensing function or the like, and other optical element.

With the above described configuration, the zoom lens according to the embodiment has a high zoom ratio and achieves excellent optical performance throughout the entire zoom range in spite of its simple lens configuration and compactness in size.

It should be noted that the essential features of the zoom lens according to the present invention is what is described above, and the following descriptions of zoom lens configurations and conditional expressions merely disclose concrete configurations that are presented by way of example. Therefore, the any feature or condition described in the following is not necessarily required, as a matter of course.

In the following embodiments of the zoom lens according to the present invention and an image pickup apparatus equipped with such a zoom lens will be described.

Figure 1B:
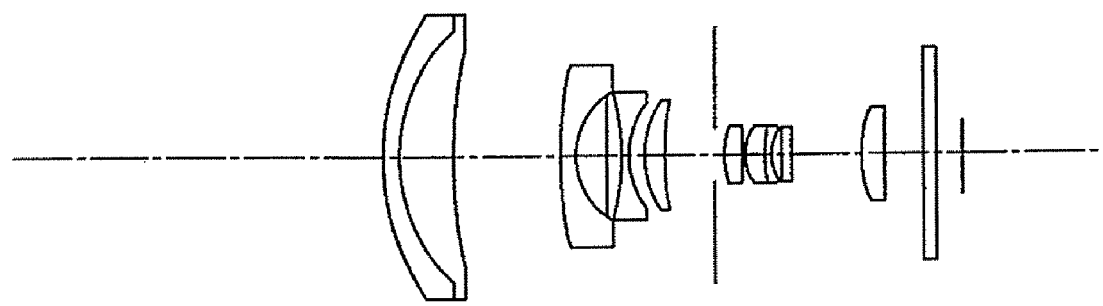
Figure 1C:
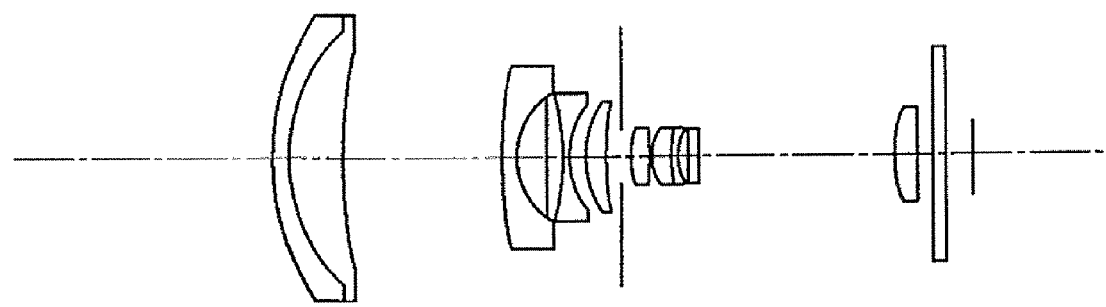

FIGS. 1A, 1B and 1C are cross sectional views illustrating the lens configuration of a zoom lens according to a first embodiment of the present invention at the wide angle end position (i.e. the shortest focal length position), an intermediate zoom position, and the telephoto end position (i.e. the longest focal length position) respectively.

Figure 2A:
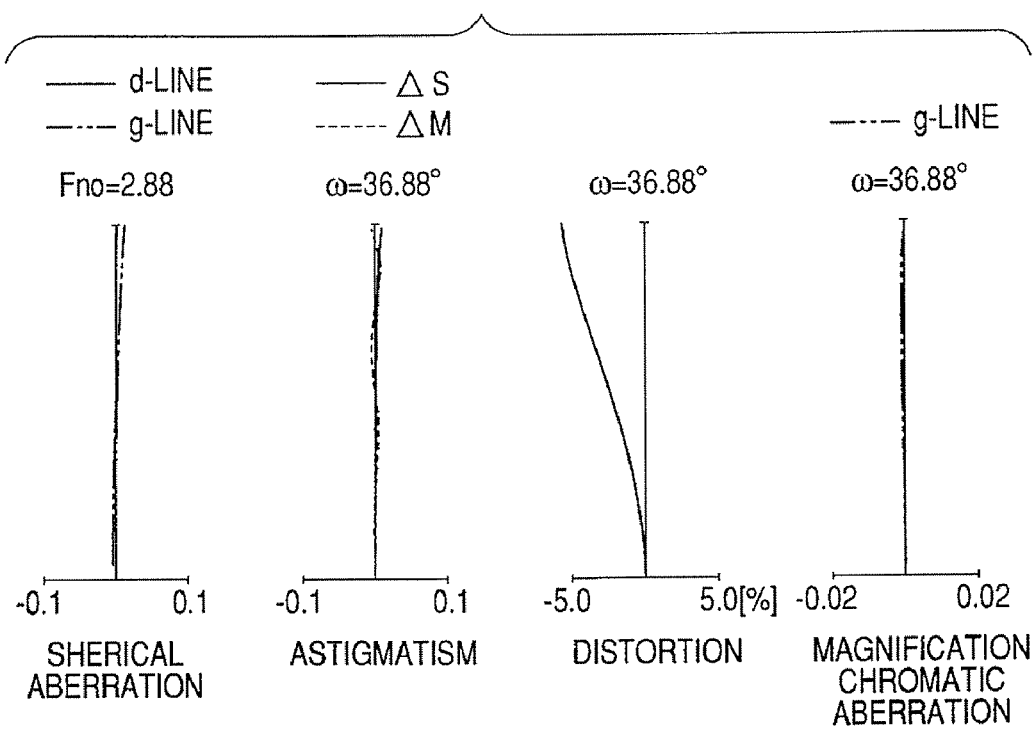
FIG. 2A illustrates aberrations of the zoom lens according to the first embodiment at the wide angle end position.
Figure 2B:
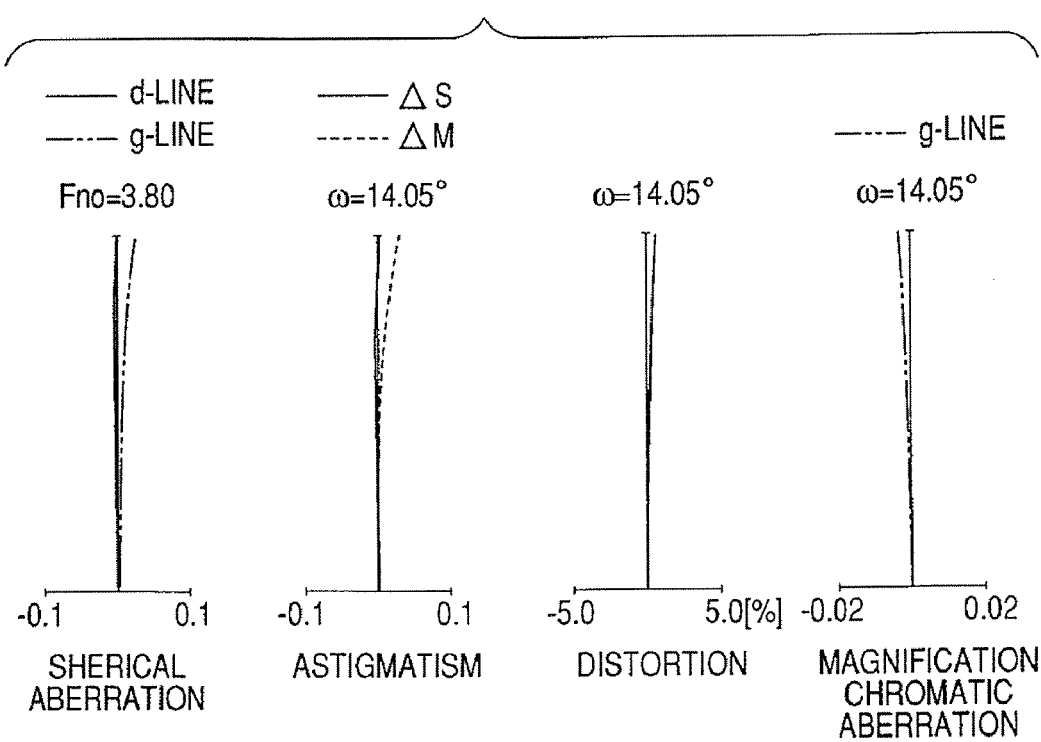
FIG. 2B illustrates aberrations of the zoom lens according to the first embodiment at an intermediate zoom position.
Figure 2C:
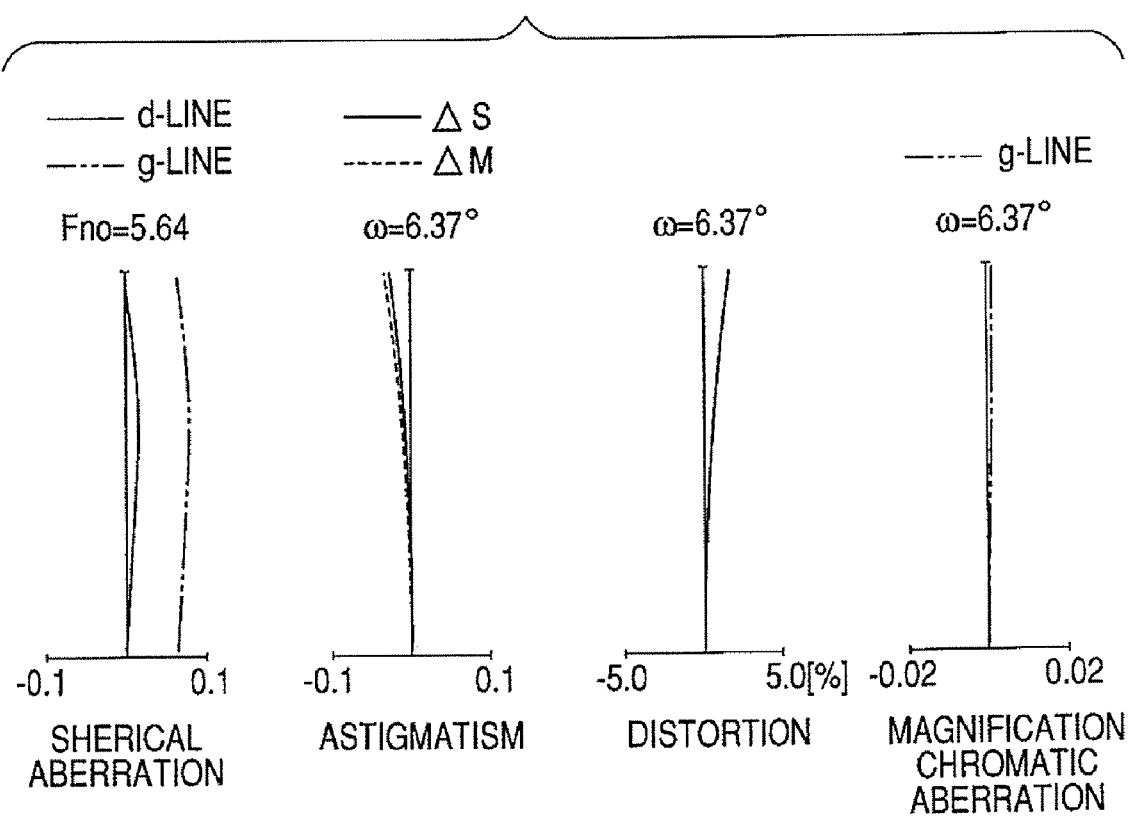
FIG. 2C illustrates aberrations of the zoom lens according to the first embodiment at the telephoto end position.

FIGS. 2A, 2B and 2C illustrate longitudinal aberrations of the zoom lens according to the first embodiment of the present invention at the wide angle end position, an intermediate zoom position, and the telephoto end position respectively.

Figure 3A:
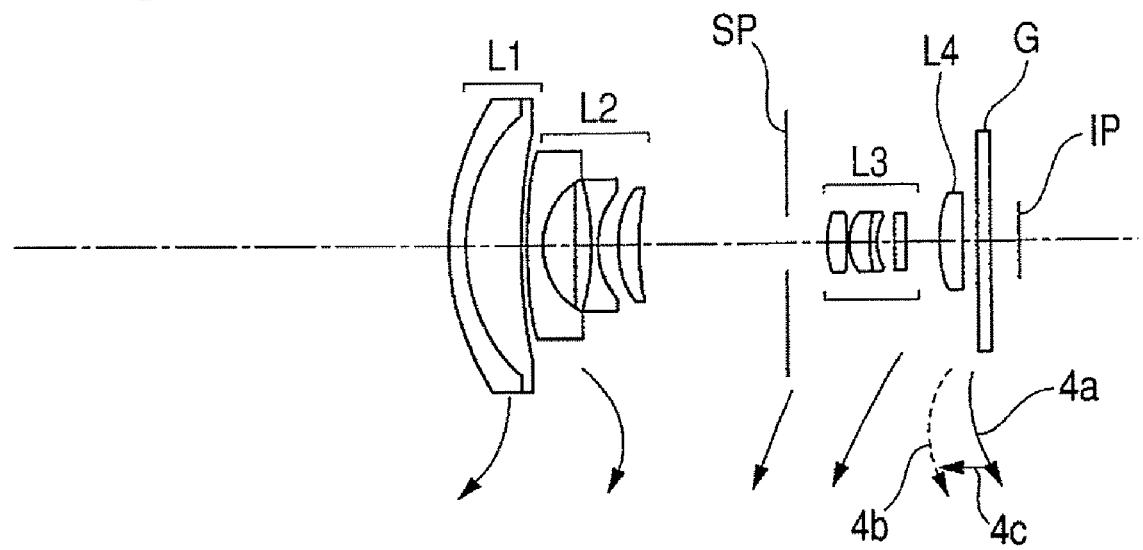
FIGS. 3A, 3B and 3C are cross sectional views illustrating the lens configuration of a zoom lens according to a second embodiment.
Figure 3B:
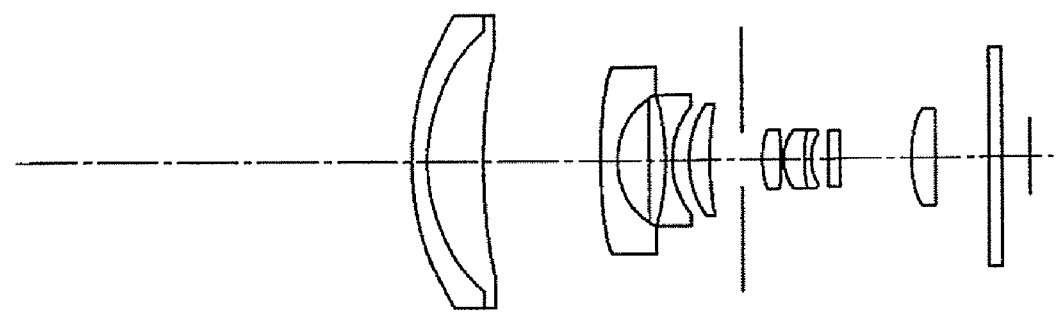
Figure 3C:
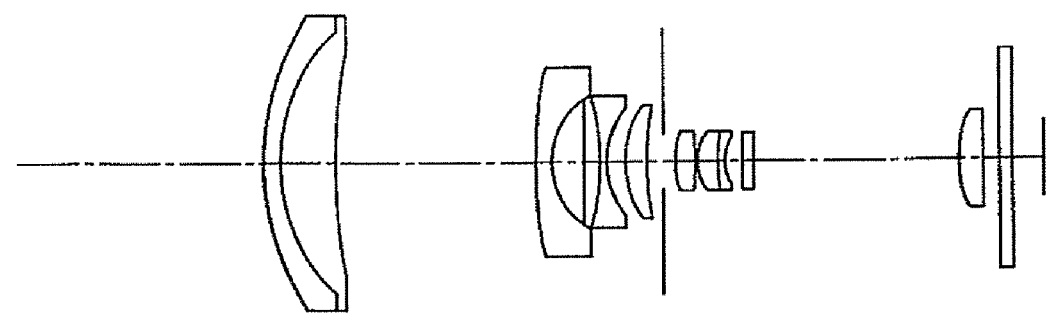

FIGS. 3A, 3B and 3C are cross sectional views illustrating the lens configuration of a zoom lens according to a second embodiment of the present invention at the wide angle end position, an intermediate zoom position, and the telephoto end position respectively.

Figure 4A:
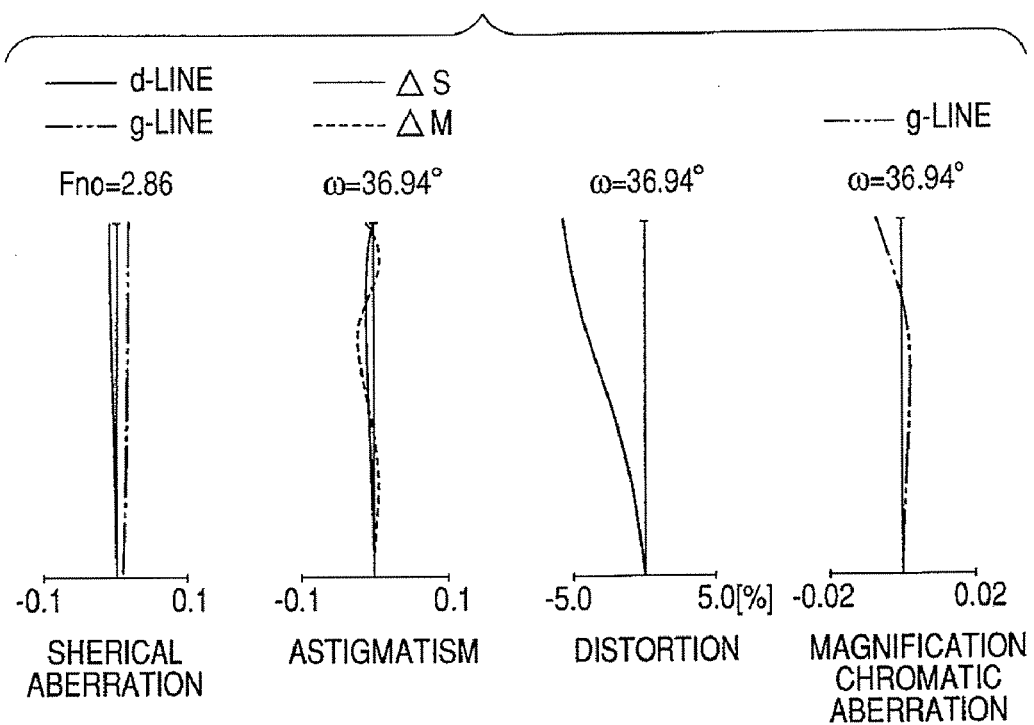
FIG. 4A illustrates aberrations of the zoom lens according to the second embodiment at the wide angle end position.
Figure 4B:
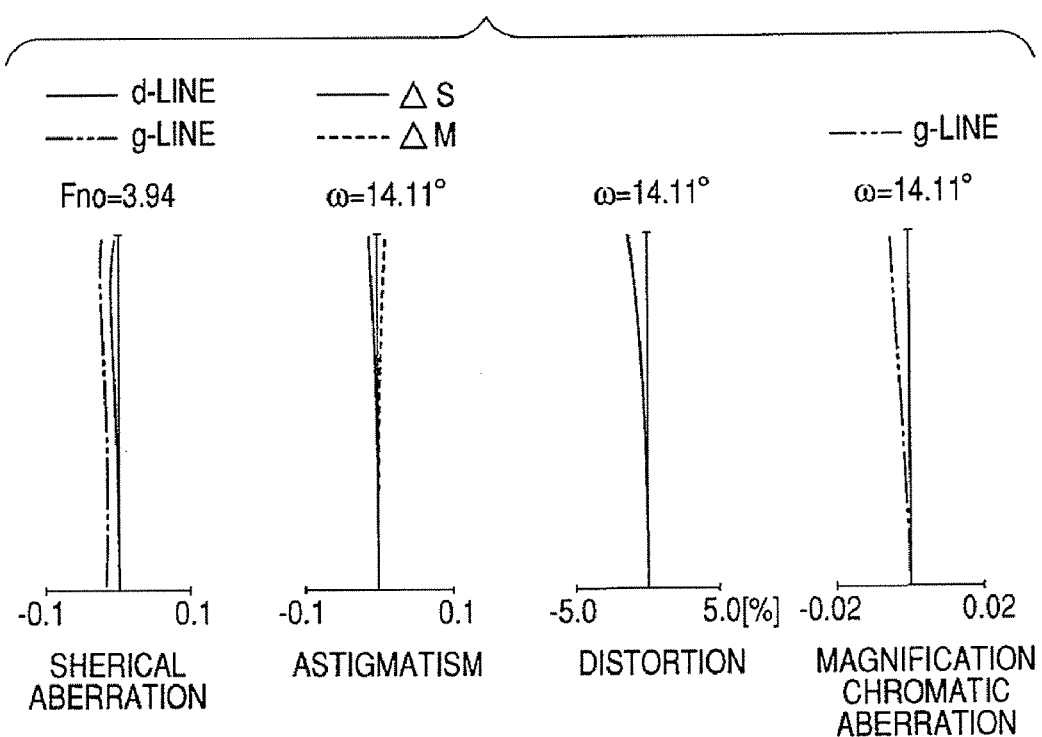
FIG. 4B illustrates aberrations of the zoom lens according to the second embodiment at an intermediate zoom position.

FIGS. 4A, 4B and 4C illustrate longitudinal aberrations of the zoom lens according to the second embodiment of the present invention at the wide angle end position, an intermediate zoom position, and the telephoto end position respectively.

Figure 5A:
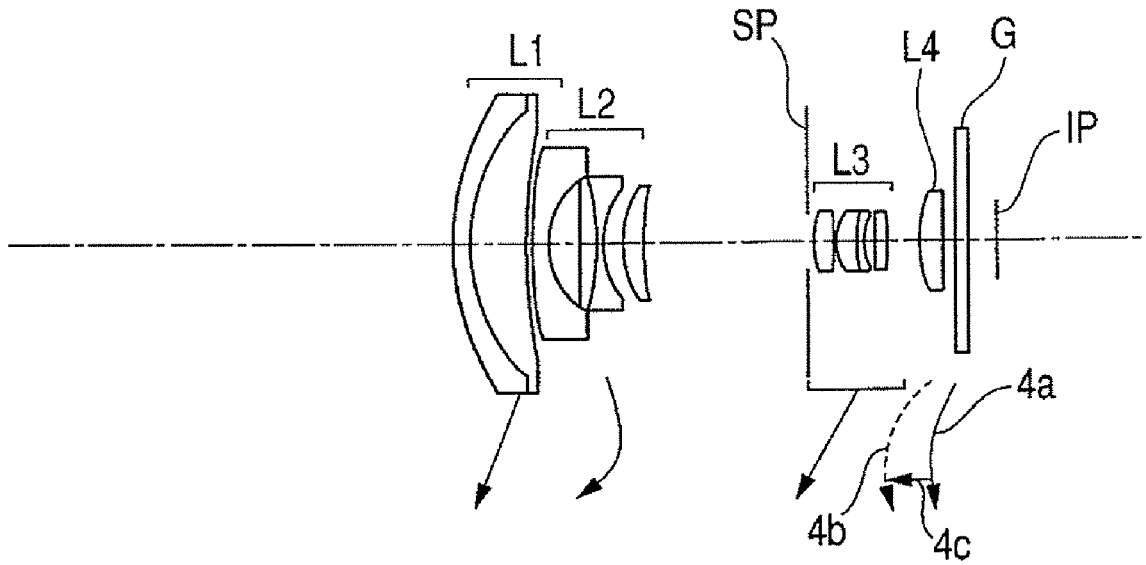
FIGS. 5A, 5B and 5C are cross sectional views illustrating the lens configuration of a zoom lens according to a third embodiment.
Figure 5B:
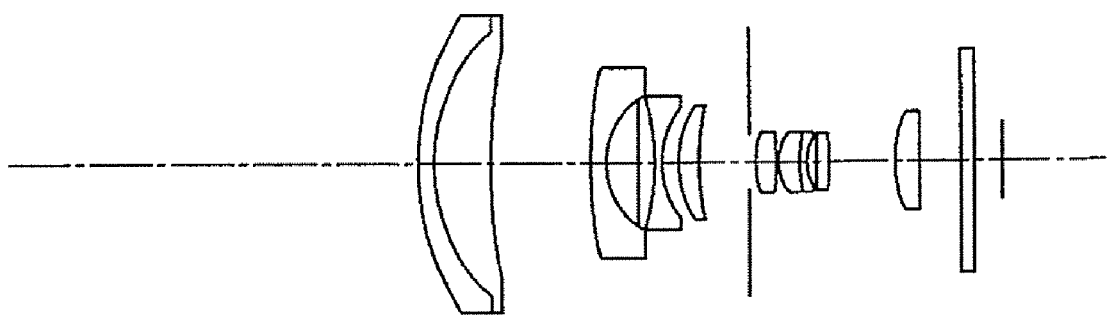
Figure 5C:
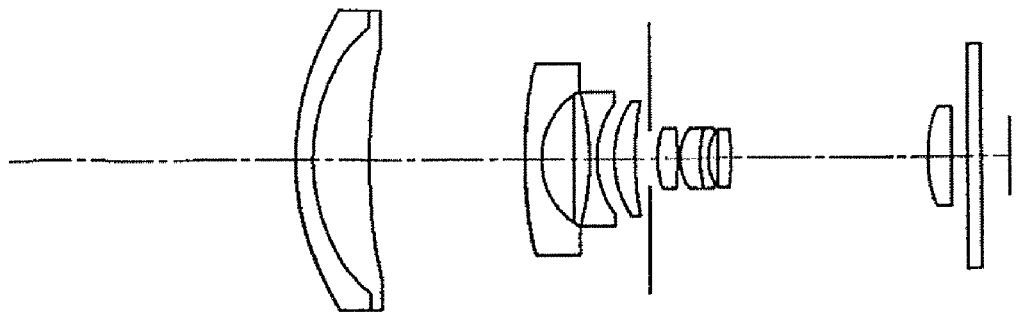

FIGS. 5A, 5B and 5C are cross sectional views illustrating the lens configuration of a zoom lens according to a third embodiment of the present invention at the wide angle end position, an intermediate zoom position, and the telephoto end position respectively.

Figure 6A:
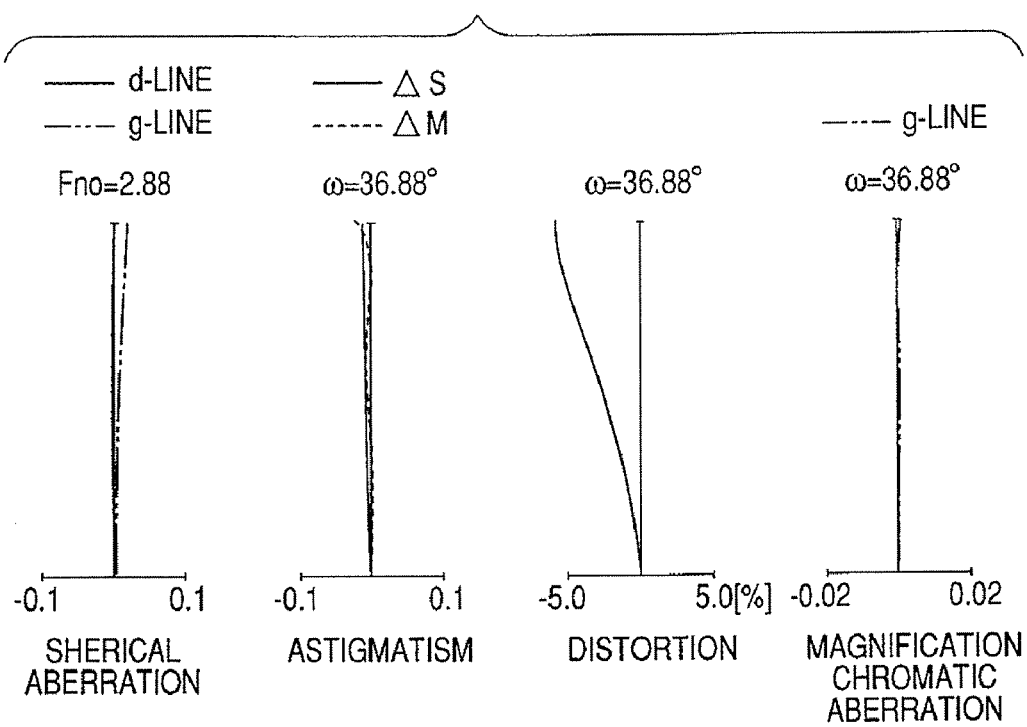
FIG. 6A illustrates aberrations of the zoom lens according to the third embodiment at the wide angle end position.
Figure 6B:
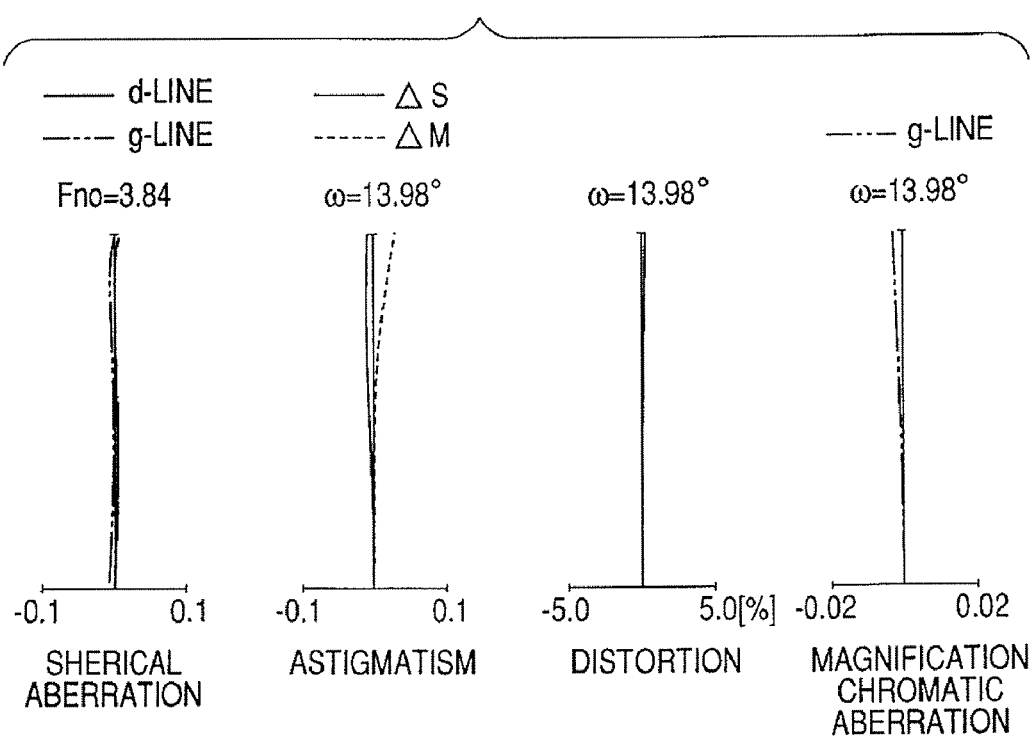
FIG. 6B illustrates aberrations of the zoom lens according to the third embodiment at an intermediate zoom position.
Figure 6C:
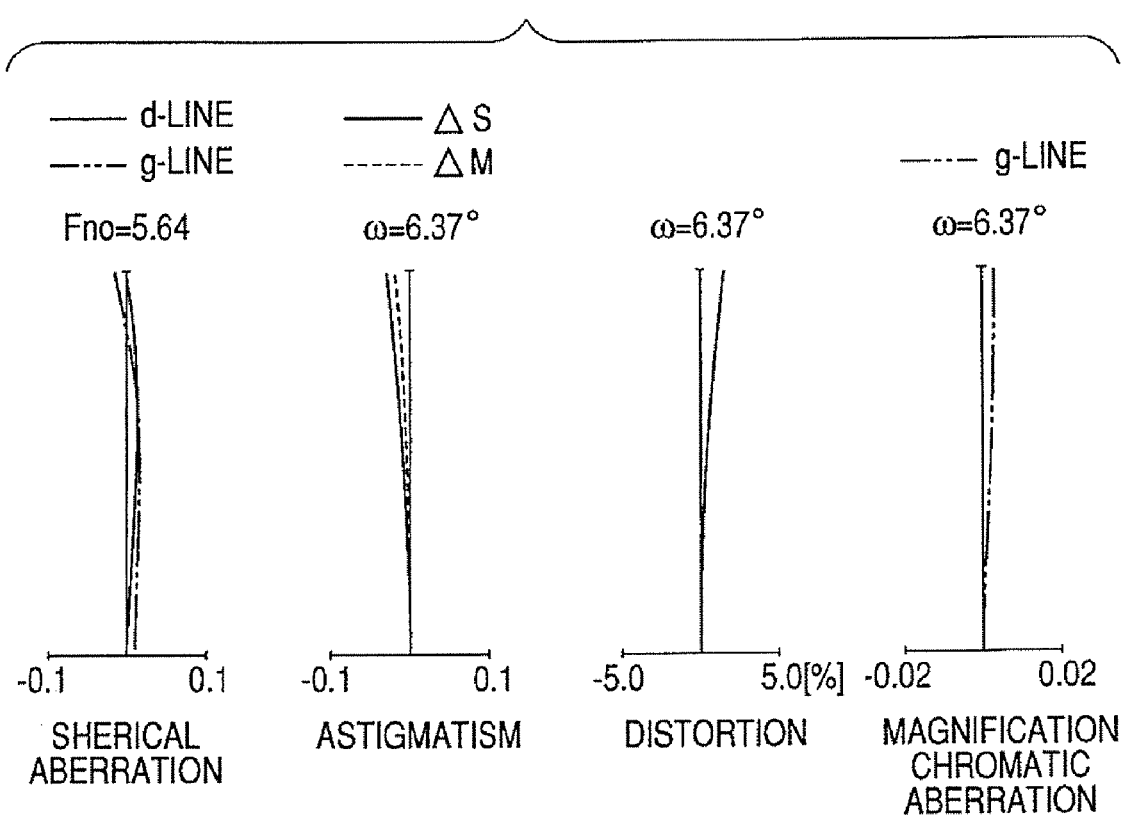
FIG. 6C illustrates aberrations of the zoom lens according to the third embodiment at the telephoto end position.

FIGS. 6A, 6B and 6C illustrate longitudinal aberrations of the zoom lens according to the third embodiment of the present invention at the wide angle end position, an intermediate zoom position, and the telephoto end position respectively.

Figure 7A:
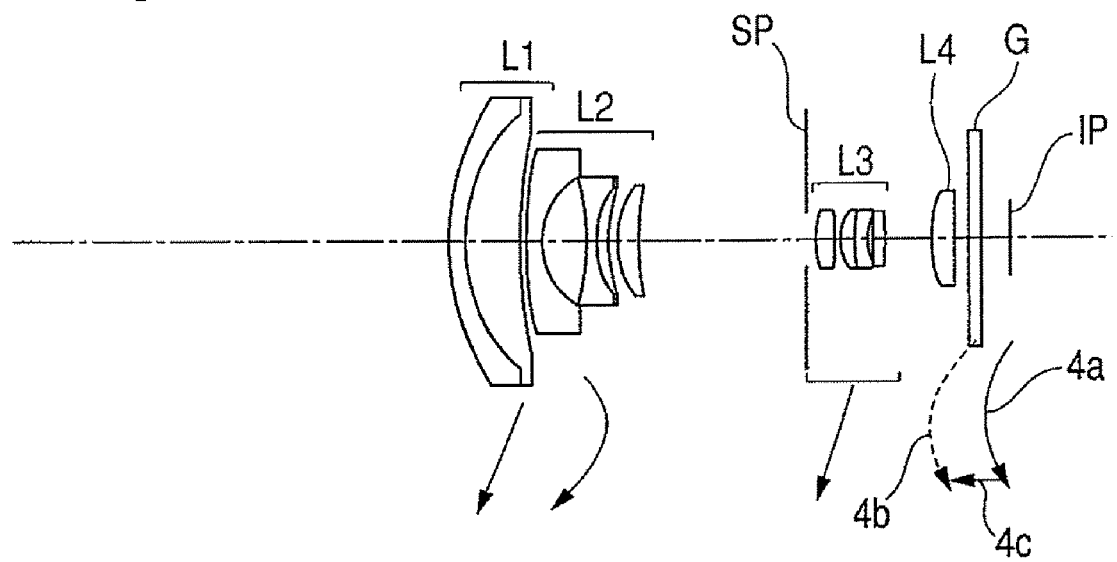
FIGS. 7A, 7B and 7C are cross sectional views illustrating the lens configuration of a zoom lens according to a fourth embodiment.
Figure 7B:
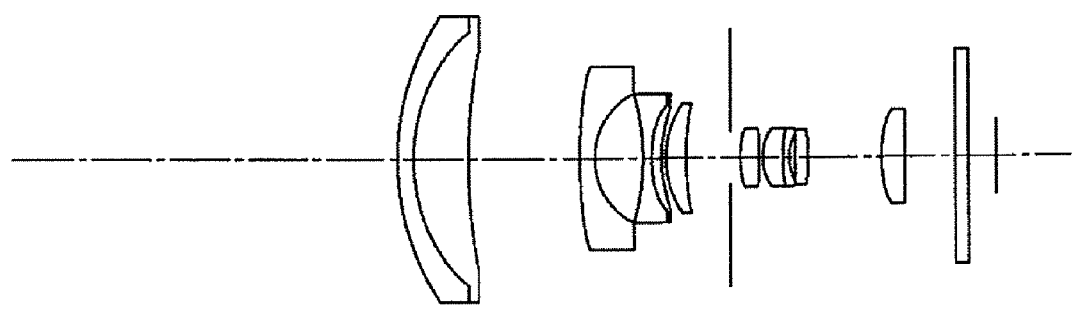
Figure 7C:
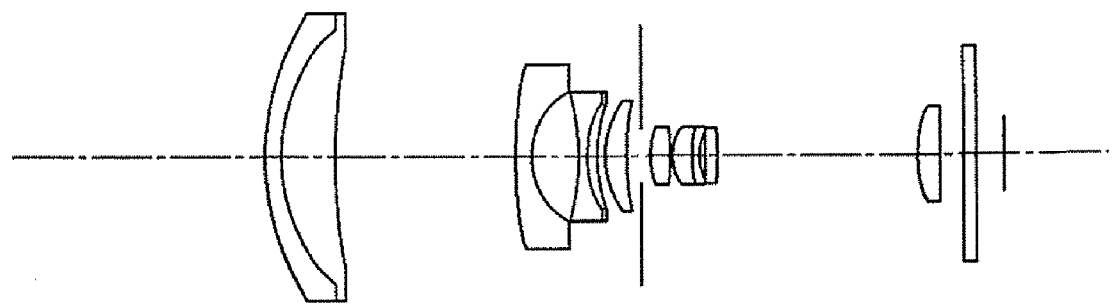

FIGS. 7A, 7B and 7C are cross sectional views illustrating the lens configuration of a zoom lens according to a fourth embodiment of the present invention at the wide angle end position, an intermediate zoom position, and the telephoto end position respectively.

Figure 8A:
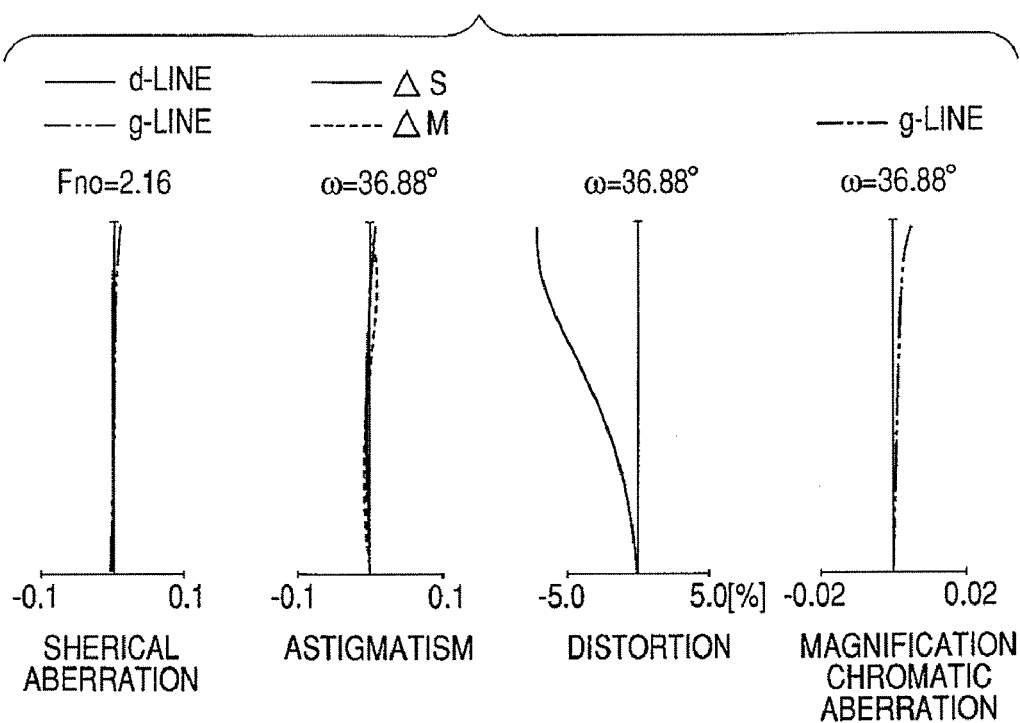
FIG. 8A illustrates aberrations of the zoom lens according to the fourth embodiment at the wide angle end position.
Figure 8B:
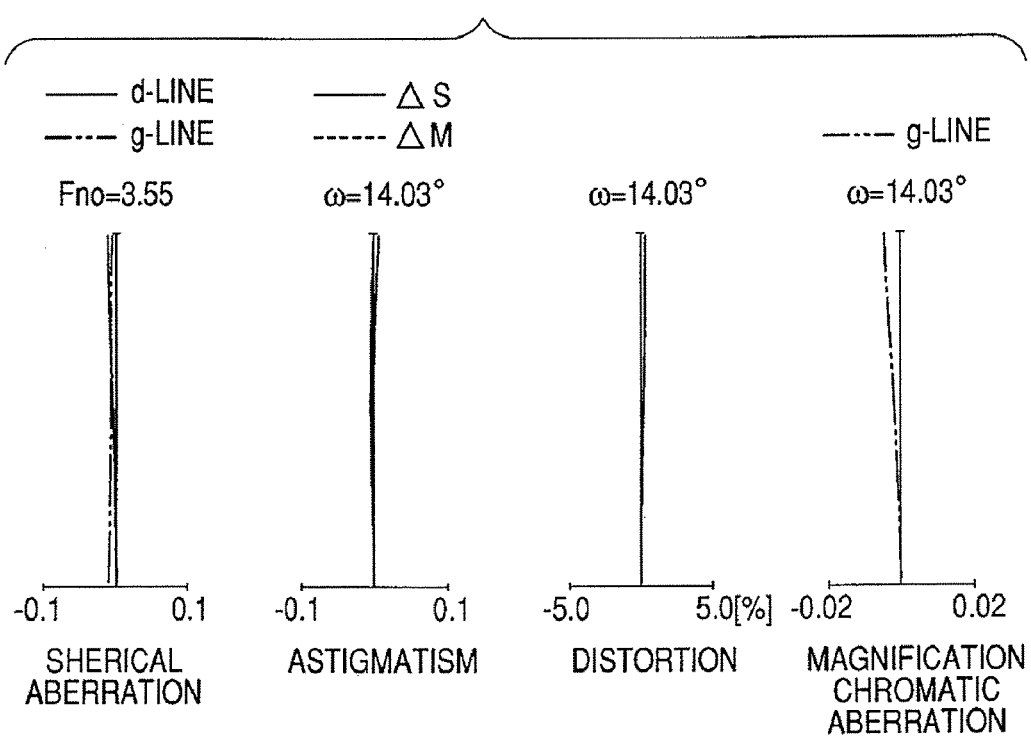
FIG. 8B illustrates aberrations of the zoom lens according to the fourth embodiment at an intermediate zoom position.

FIGS. 8A, 8B and 8C illustrate longitudinal aberrations of the zoom lens according to the fourth embodiment of the present invention at the wide angle end position, an intermediate zoom position, and the telephoto end position respectively.

Figure 9A:
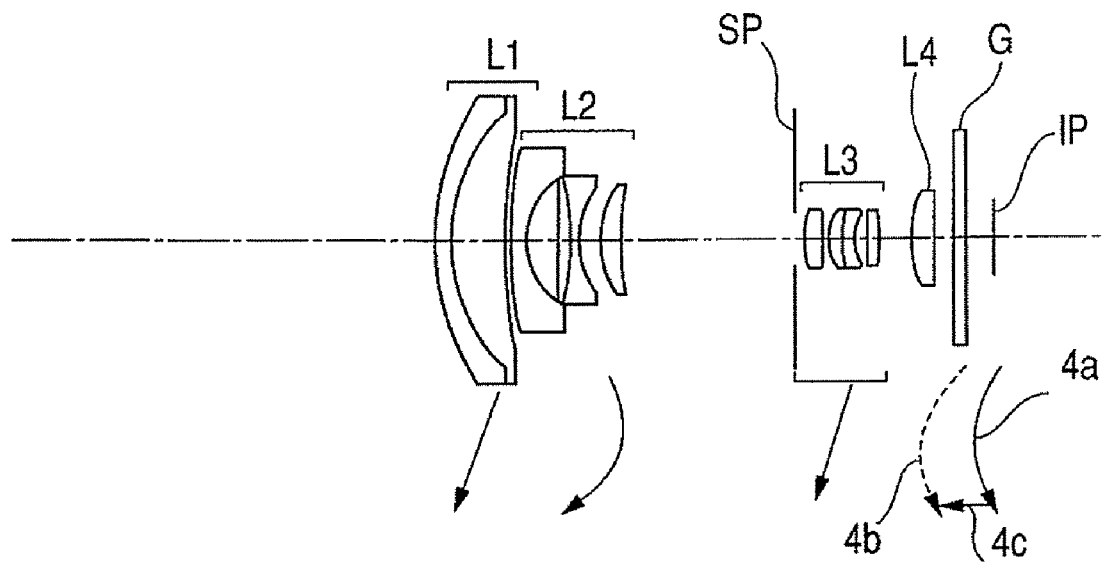
FIGS. 9A, 9B and 9C are cross sectional views illustrating the lens configuration of a zoom lens according to a fifth embodiment.
Figure 9B:
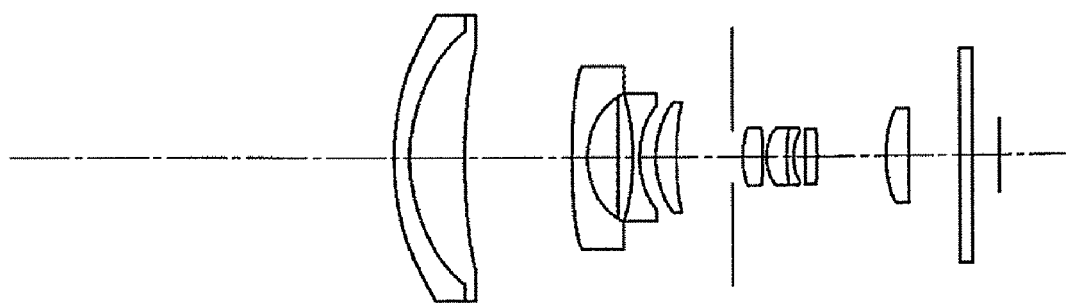
Figure 9C:
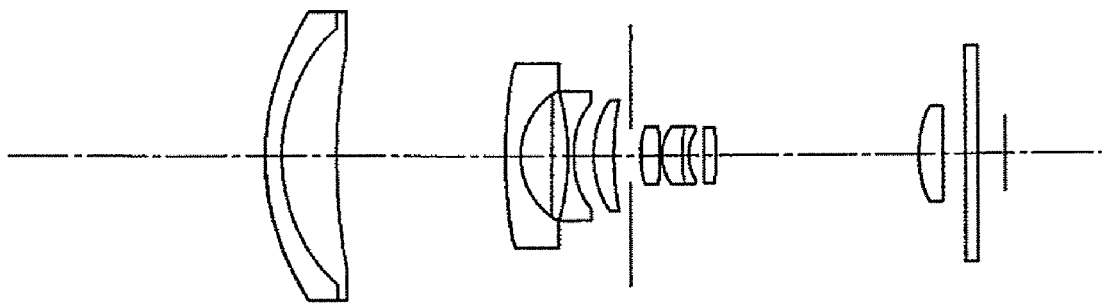

FIGS. 9A, 9B and 9C are cross sectional views illustrating the lens configuration of a zoom lens according to a fifth embodiment of the present invention at the wide angle end position, an intermediate zoom position, and the telephoto end position respectively.

Figure 10A:
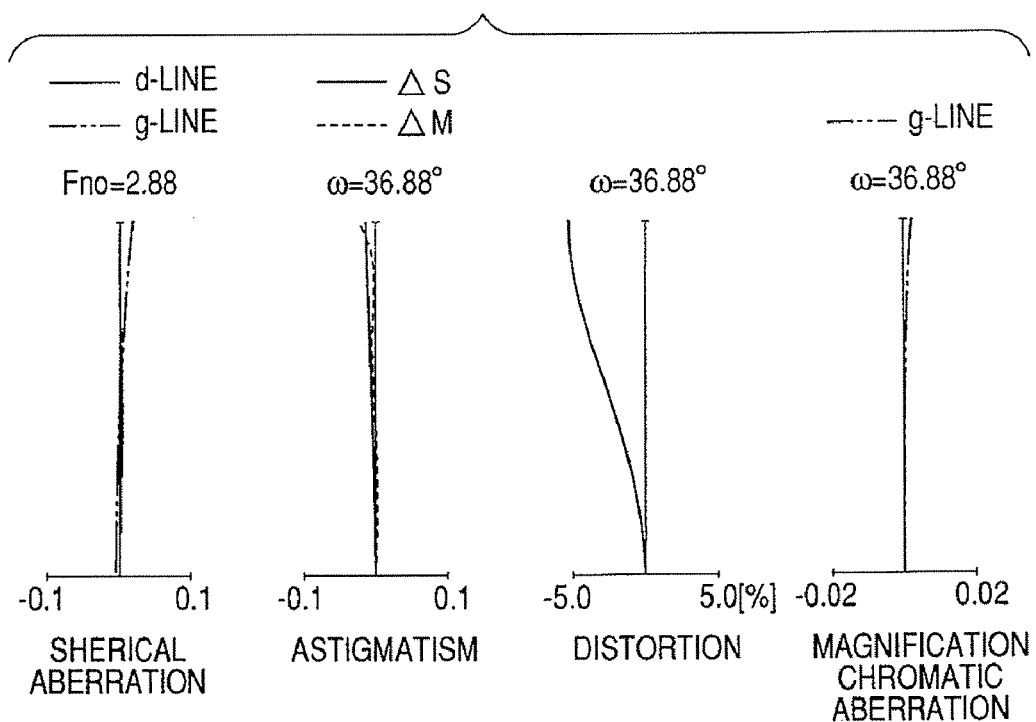
FIG. 10A illustrates aberrations of the zoom lens according to the fifth embodiment at the wide angle end position.
Figure 10B:
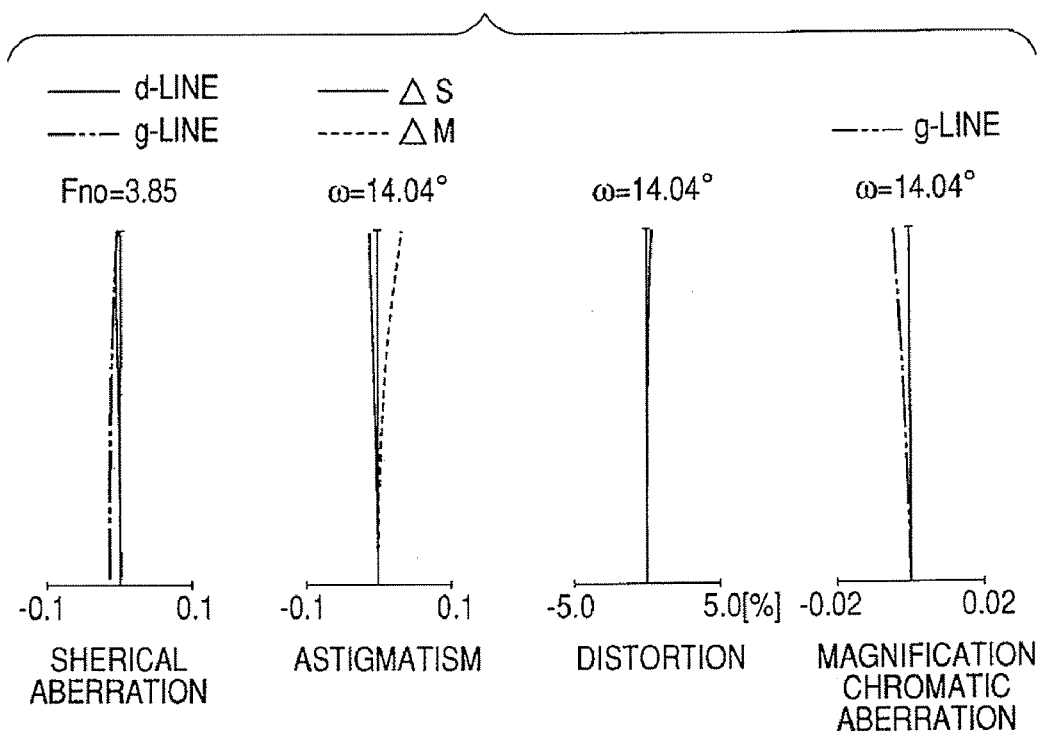
FIG. 10B illustrates aberrations of the zoom lens according to the fifth embodiment at an intermediate zoom position.

FIGS. 10A, 10B and 10C illustrate longitudinal aberrations of the zoom lens according to the fifth embodiment of the present invention at the wide angle end position, an intermediate zoom position, and the telephoto end position respectively.

Figure 11A:
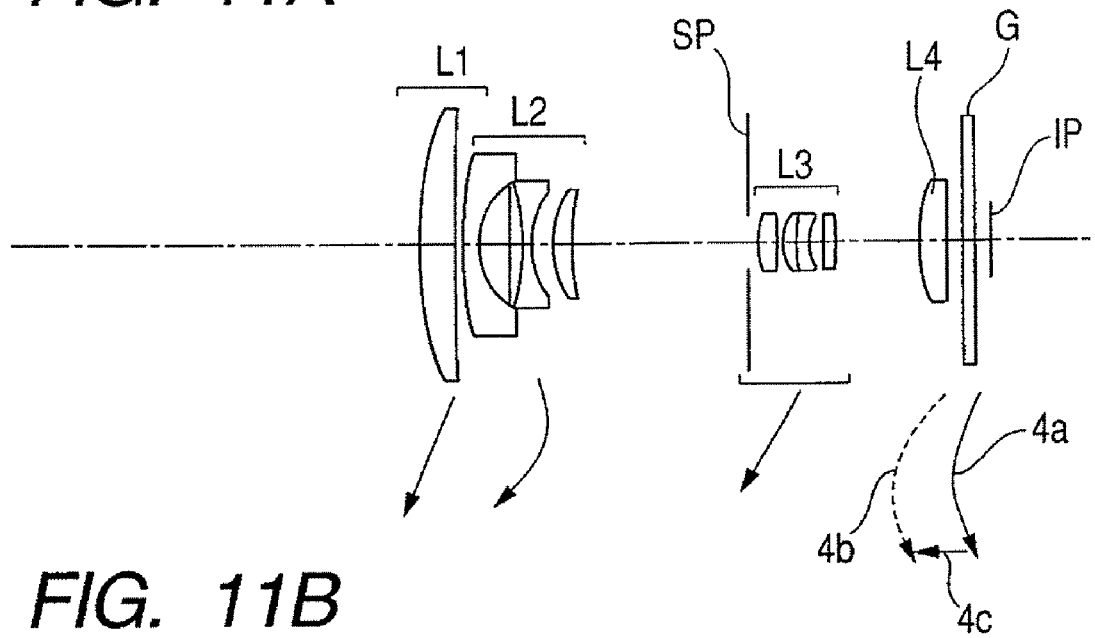
FIGS. 11A, 11B and 11C are cross sectional views illustrating the lens configuration of a zoom lens according to a sixth embodiment.
Figure 11B:
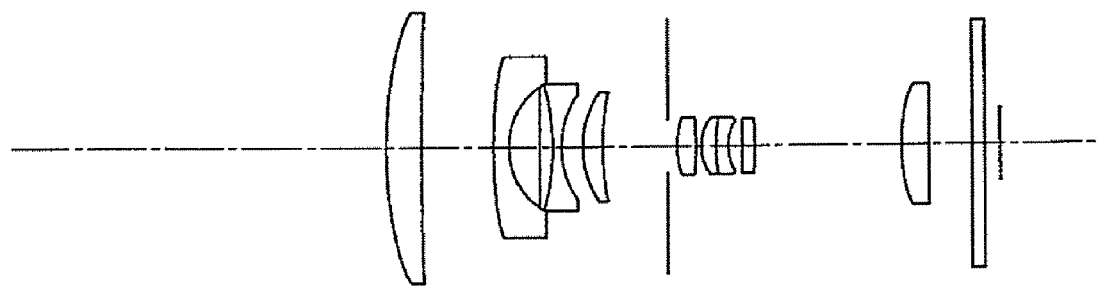
Figure 11C:
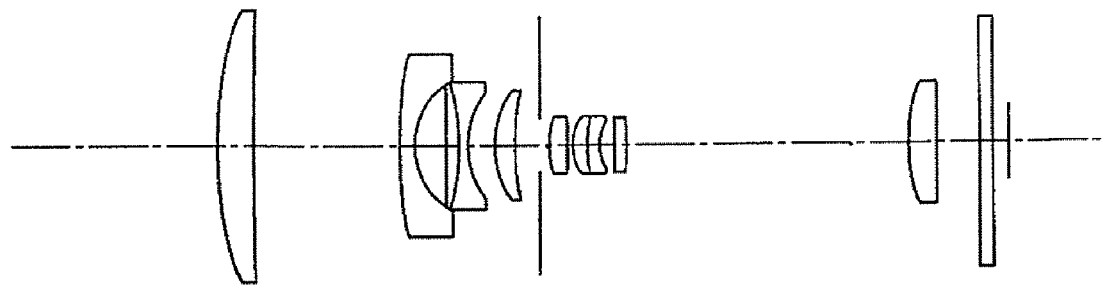

FIGS. 11A, 11B and 11C are cross sectional views illustrating the lens configuration of a zoom lens according to a sixth embodiment of the present invention at the wide angle end position, an intermediate zoom position, and the telephoto end position respectively.

Figure 12A:
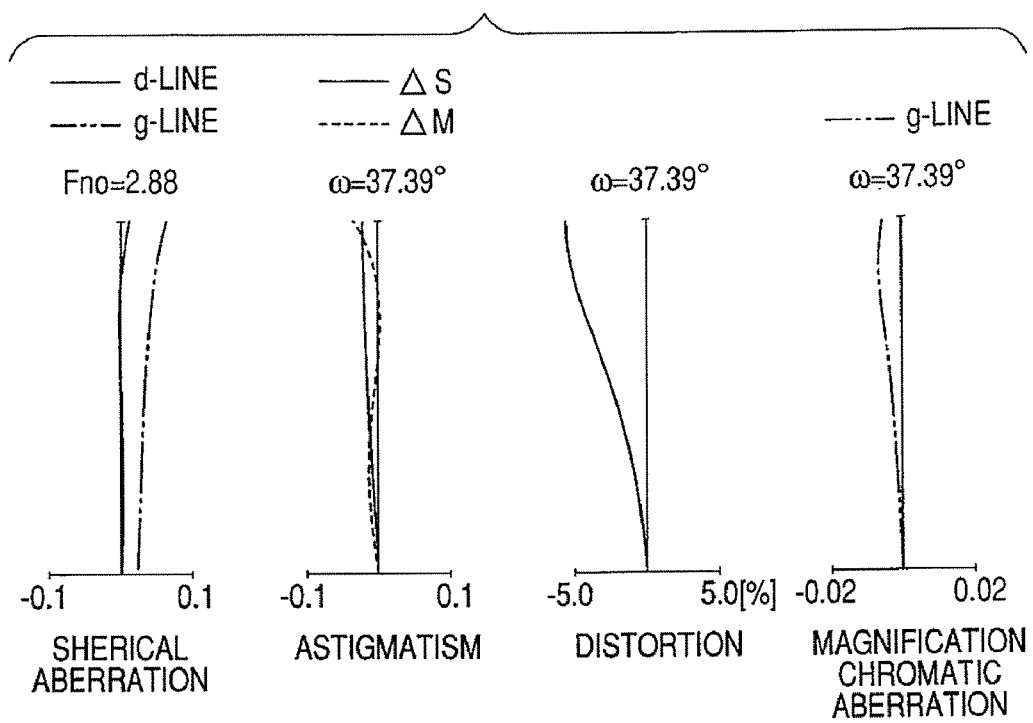
FIG. 12A illustrates aberrations of the zoom lens according to the sixth embodiment at the wide angle end position.
Figure 12B:
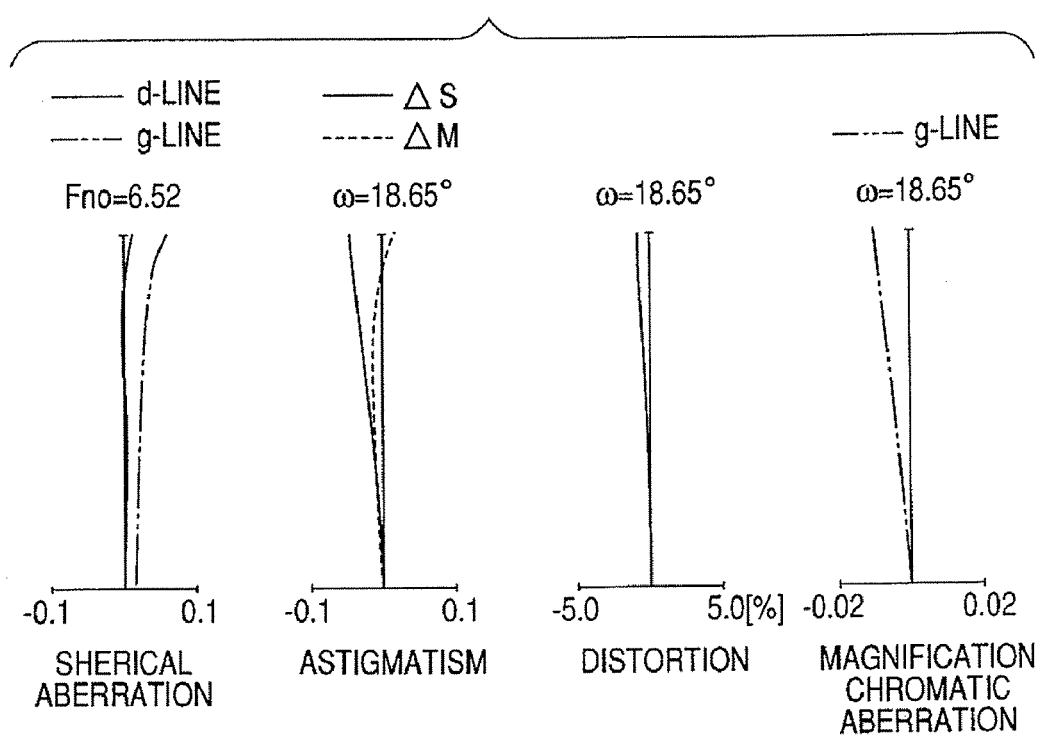
FIG. 12B illustrates aberrations of the zoom lens according to the sixth embodiment at an intermediate zoom position.
Figure 12C:
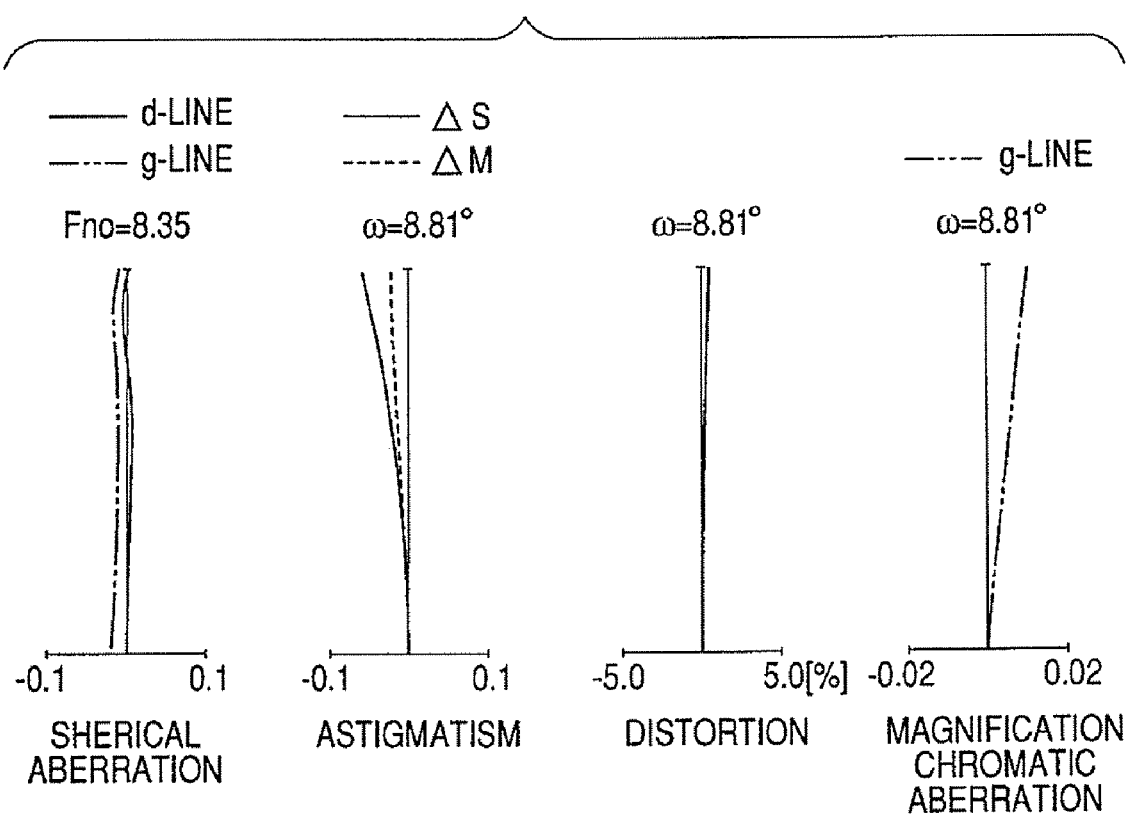
FIG. 12C illustrates aberrations of the zoom lens according to the sixth embodiment at the telephoto end position.

FIGS. 12A, 12B and 12C illustrate longitudinal aberrations of the zoom lens according to the sixth embodiment of the present invention at the wide angle end position, an intermediate zoom position, and the telephoto end position respectively.

Figure 13:
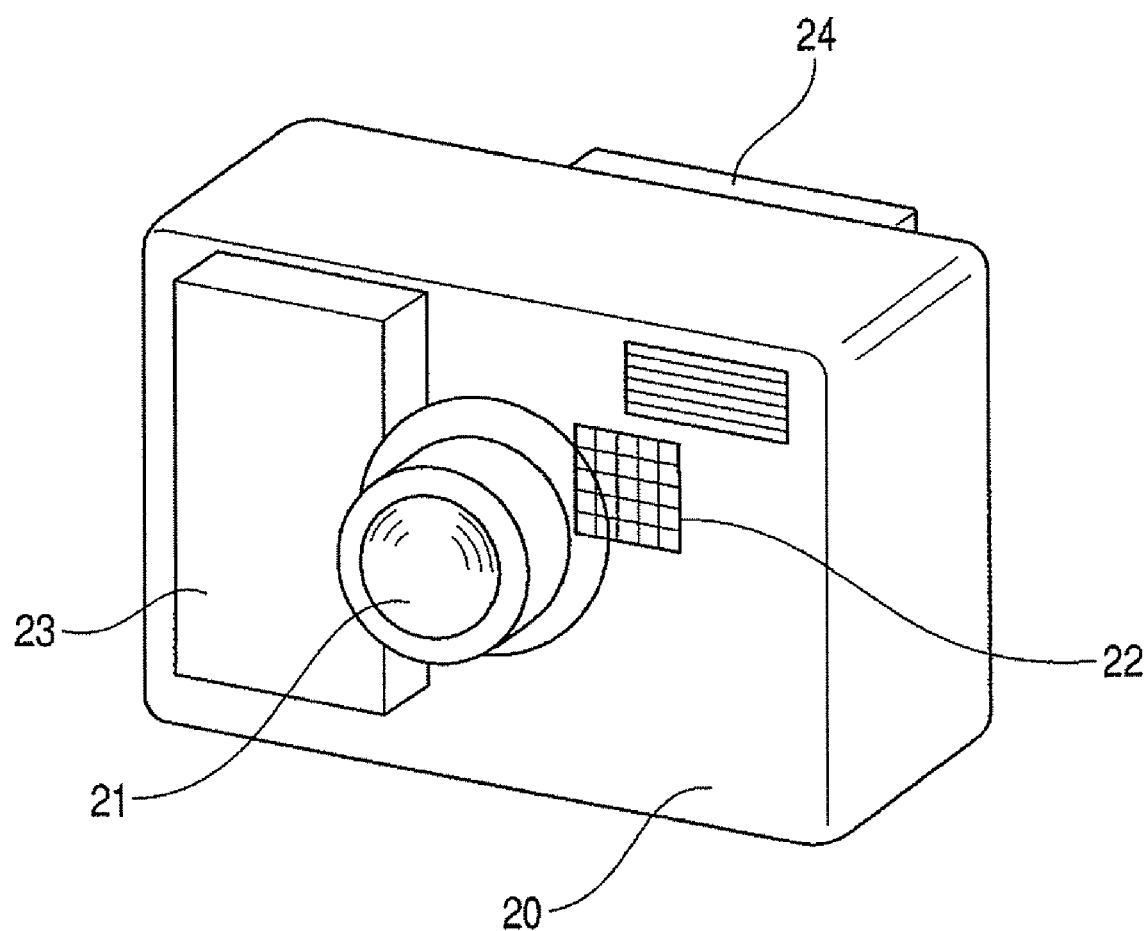
FIG. 13 is a perspective view schematically showing the relevant portion of an image pickup apparatus according to an embodiment of the present invention.

FIG. 13 is a perspective view schematically illustrating an image pickup apparatus equipped with a zoom lens according to the present invention.

The zoom lenses according to the embodiments are taking optical systems used in image pickup apparatuses such as digital still cameras, and film cameras.

In the cross sectional views of the zoom lenses, the object side (or the front) is shown in the left and the image side (or the rear) is shown in the right.

Each zoom lens illustrated in the cross sectional views includes the first lens unit L1 having a positive refractive power (i.e. the optical power, equivalent to the inverse of the focal length), the second lens unit L2 having a negative refractive power, the third lens unit L3 having a positive refractive power, the fourth lens unit L4 having a positive refractive power and an optical block G such as an optical filter, a face plate, a quartz low pass filter, or an infrared cut filter.

When the zoom lens is used as the taking optical system of a video camera or a digital still camera, the image plane IP corresponds to the image surface of a solid state image pickup element (photoelectric conversion element) such as a CCD sensor or a CMOS sensor. The zoom lens also has an aperture stop SP disposed on the image side of the second lens unit L2.

In the aberration diagrams, the F-number Fno is indicated. In the aberration diagrams are shown curves for the d-line and g-line (designated by "d" and "g") and the meridional image plane ΔM and the sagittal image plane ΔS for the d-line. The magnification chromatic aberrations (lateral chromatic aberration) are shown for the g-line.

In the embodiments described in the following, the wide angle end zoom position and the telephoto end zoom position refer to the zoom positions at the time when the lens unit for changing the magnification (that is, the third lens unit L3 in the embodiments) is at the ends of the range over which that lens unit can move mechanically along the optical axis.

In each embodiment, the lens units L1 to L4 are adapted to move, upon zooming from the wide angle end to the telephoto end, in a manner illustrated by arrows in the cross sectional views.

More specifically, the lens units are moved in the following manner.

The first lens unit L1 moves monotonously toward the object side or moves in a way represented by an arrow (in the cross sectional views) that is convex toward the image side. By such movement, the first lens unit L1 is located closer to the object side at the telephoto end than at the wide angle end.

In connection with the above, in the first to fifth embodiment, the first lens unit L1 moves in a way represented by an arrow (in the cross sectional views) that is convex toward the image side, while in the sixth embodiment, the first lens unit L1 moves monotonously toward the object side.

The second lens unit L2 moves monotonously toward the image side, or moves in a way represented by an arrow that is convex toward the image side. By such movement, the second lens unit L2 is located closer to the image side at the telephoto end than at the wide angle end. The third lens unit L3 moves monotonously toward the object side to play a principal role in changing the magnification (or focal length). The fourth lens unit L4 moves in a way represented by an arrow that is convex toward the object side.

The lens units are moved in such a way that the distance between the first lens unit L1 and the second lens unit L2 is larger at the telephoto end than at the wide angle end, the distance between the second lens unit L2 and the third lens unit L3 is smaller at the telephoto end than at the wide angle end, and the distance between the third lens unit L3 and the fourth lens unit L4 is larger at the telephoto end than at the wide angle end.

All the lens units are moved to correct variations in the image plane caused upon zooming or changing the magnification. Thus, efficient distribution of the refractive power among the lens units can be achieved easily.

Furthermore, the zoom lenses according to the embodiments are designed in such a way that the entire length of the optical system becomes short at the wide angle end. Accordingly, there are provided small size zoom lenses having a high zoom ratio, which are suitable for use in, for example, digital still cameras.

In all the embodiments, a rear focus system in which the fourth lens unit L4 is moved along the optical axis for focusing is used.

Upon focusing operation from an infinite object to an object at a short distance at the telephoto end, the fourth lens group L4 is moved frontward as indicated by arrows 4c. The curved arrow 4a drawn by the solid line and the curved arrow 4b drawn by the broken line represent the movements of the fourth lens unit L4, with which variations in the image plane are corrected upon zooming from the wide angle end to the telephoto end, respectively in the state in which the lens is focused on an infinite object and in the state in which the lens is focused on an object at a short distance.

In all the embodiments, by moving the fourth lens unit L4 that is light in weight for focusing, focusing can be performed easily at high speed.

In the first, third, fourth, fifth and sixth embodiments, the aperture stop SP moves integrally with the third lens unit L3 upon zooming.

In the second embodiment, the aperture stop SP moves independently from all of the lens units upon zooming.

In this case, the aperture stop SP moves in such a way that the distance between the aperture stop and the third lens unit L3 becomes larger at the wide angle end than at the telephoto end. By this feature, undesirable light is effectively prevented from entering the peripheral region of the image frame at the wide angle end.

In all the embodiments the first lens unit L1 has two or less lenses including a positive lens.

In the embodiments disclosed herein, the first lens unit L1 comprises a cemented lens made by cementing a positive lens and a negative lens. However, the first lens unit L1 may comprise a single positive lens. The use of two lenses including a positive lens and a negative lens in the first lens unit L1 makes correction of chromatic aberrations easier.

The second lens unit L2 has a negative lens, a cemented lens composed of two lenses having refractive powers of opposite signs, and a positive lens arranged in the mentioned order from the object side to the image side.

In the embodiments disclosed herein, the second lens unit L2 has a negative lens, a cemented lens composed of two lenses having refractive powers of opposite signs, and a positive lens arranged in the mentioned order from the object side to the image side. However, the second lens unit L2 may include four or more lenses. For example, the second lens unit may include five or six lenses.

The cemented lens included in the second lens unit L2 may be composed of a negative lens and a positive lens both made of a glass material, or alternatively, the cemented lens may be an optical element composed of a negative lens and a positive lens in the form of a resin layer formed on a light transmitting surface of that negative lens.

At least one optical surface in the second lens unit L2 has an aspherical shape.

The third lens unit L3 has a positive lens of a biconvex shape, a cemented lens made by cementing a positive lens having a convex surface facing the object side and a negative lens having a concave surface facing the image side, and a positive lens arranged in the mentioned order from the object side to the image side.

The lens surface in the third lens unit L3 that is closest to the object side (i.e. the frontmost lens surface in the third lens unit L3) has an aspherical shape. It is intended that the configuration in which the third lens unit L3 functions as the main magnification changing lens unit will lead to a reduction in the entire length of the zoom lens and a reduction in the diameter of the frontmost lens.

The fourth lens unit L4 includes only one lens having a positive refractive power.

To achieve further improvement in the optical performance or to further reduce the size of the entire lens system, it is more desirable that the zoom lenses according to the embodiments satisfy one of the following conditions:

$$0.1 < (R41+R52)/(R41-R52) < 1.7 \quad (1)$$

$$1.75 < N2n < 2.0 \quad (2)$$

$$1.65 < N2p < 2.0 \quad (3)$$

$$0.9 < d2/\sqrt{(fw \cdot ft)} < 1.6 \quad (4)$$

$$4 < v2sn - v2sp < 30 \quad (5)$$

where, R41 and R52 respectively represent the radius of curvature of the object side surface and the radius of curvature of the image side surface of the cemented lens in the second lens unit L2, N2n represents the average refractive index of the material of which the negative lens in the second lens unit L2 is made, N2p represents the average refractive index of the material of which the positive lens in the second lens unit L2 is made, d2 represents the distance, on the optical axis, from the rear end (i.e. the rearmost lens surface) of the second lens unit L2 to the aperture stop SP at the wide angle end, v2sn and v2sp respectively represent the Abbe numbers of the materials of which the negative lens and the positive lens in the cemented lens are respectively made, and fw and ft represent the focal lengths of the entire lens system at the wide angle end and the telephoto end respectively. When calculating the values of "N2n" and "N2p", a lens (resin lens) which is made of resin and is used as a constituent element for a compound lens is handled as an lens element or a single lens element. When at least one of the above conditions is satisfied, a further reduction in the size and a further reduction of aberrations are achieved.

In the following, technical meaning of the above conditional expressions will be described. It should be noted, however, that what is described in the following is additional effects provided by additional conditions (the above conditional expressions (1) to (5)) that may be optionally added to the essential features of the embodiments. Accordingly, the above conditional expressions (1) to (5) are not necessarily required to be satisfied.

Conditional expression (1) relates to the shape factor of the cemented lens in the second lens unit L2. Above the upper limit value or below the lower limit value of conditional expression (1), coma flare in the peripheral region of the image frame increases so much in the wide angle zoom range that it is difficult to correct such coma flare satisfactorily.

Conditional expression (2) relates to the average refractive index of the material of which the negative lens in the second lens unit L2 is made. When the refractive index is too large or above the upper limit value of conditional expression (2), usable lens materials are limited, and it is difficult to manufacture that negative lens. On the other hand, when the refractive index is too small or below the lower limit value of conditional expression (2), the Petzval sum becomes too small. This disadvantageously deteriorates image plane characteristics.

Conditional expression (3) relates to the average refractive index of the material of which the positive lens in the second lens unit L2. When the refractive index is too large or above the upper limit value of conditional expression (3), usable lens materials are limited, and it is difficult to manufacture that positive lens. On the other hand, when the refractive index is too small or below the lower limit value of conditional expression (3), the axial length of the second lens unit L2 becomes large. This undesirably leads to an increase in the diameter of the frontmost lens and an increase in the entire length of the zoom lens.

Conditional expression (4) is introduced to standardize the distance (or spacing), on the optical axis, between the second lens unit L2 and the aperture stop SP at the wide angle end by the focal length at an intermediate zoom position. When the distance d2 is so large that the value defined in the conditional expression (4) becomes larger than the upper limit value of the conditional expression (4), there undesirably result an increase in the diameter of the frontmost lens and an increase in the size of the entire zoom lens system. On the other hand, when the distance d2 is so small that the value defined in the conditional expression (4) becomes smaller than the lower limit value of the conditional expression (4), there arises a need to increase the refractive power of each lens unit to achieve a predetermine zoom ratio. This makes it difficult to correct coma flare in the peripheral region of the image frame in the wide angle zoom range.

The conditional expression (5) relates to the difference between the Abbe numbers of the material of the negative lens and the material of the positive lens included in the cemented lens in the second lens unit L2. Above the upper limit value or below the lower limit value of conditional expression (5), it is difficult to correct chromatic aberrations such as color halo in the peripheral region of the image frame in the wide angle range satisfactorily.

To correct aberrations and to make the size of the entire lens system small, it is more desirable that the numerical ranges of conditional expressions (1) to (5) be modified as follows.

$$0.2 < (R41+R52)/(R41-R52) < 1.2 \quad (1a)$$

$$1.79 < N2n < 1.95 \quad (2a)$$

$$1.75 < N2p < 1.95 \quad (3a)$$

$$1.0 < d2/\sqrt{(fw \cdot ft)} < 1.5 \quad (4a)$$

$$5 < v2sn - v2sp < 25 \quad (5a)$$

In the following, the lens configuration of the lens units in the embodiments will be described. In each embodiment, each lens unit includes lenses as described below. The lenses in each lens unit is arranged in the mentioned order from the object side to the image side.

First Embodiment

The first lens unit L1 includes a cemented lens made by cementing a negative lens and a positive lens. The cemented lens has a meniscus shape with the convex surface facing the object side.

The second lens unit L2 includes a negative lens having a meniscus shape with the convex surface facing the object side, a cemented lens composed of a positive lens made of a glass material having a positive surface facing the image side and a biconcave negative lens made of a glass material, and a positive lens having a meniscus shape with the convex surface facing the object side. The image side surface of the negative lens in the cemented lens has an aspherical shape.

The third lens unit L3 includes a biconvex positive lens, a cemented lens made by cementing a positive lens and a negative lens, and a biconvex positive lens. This cemented lens has a meniscus shape with the convex surface facing the object side. The object side surface of the positive lens located closest to the object side in the third lens unit L3 has an aspherical shape.

The fourth lens unit L4 includes a positive lens having a meniscus shape with the convex surface facing the object side.

In this embodiment, the stop is disposed between the second lens unit L2 and the third lens unit L3 and moved integrally with the third lens unit L3 upon changing the magnification.

Second Embodiment

The configurations of the first lens unit L1, the third lens unit L3, and the fourth lens unit L4 are the same as those in the first embodiment.

The second lens unit L2 includes a negative lens having a meniscus shape with the convex surface facing the object side, a cemented lens composed of a positive lens with a convex surface facing the image side and a biconcave negative lens, and a positive lens having a meniscus shape with the convex surface facing the object side. The object side surface of the positive lens in the cemented lens has an aspherical shape.

In this embodiment, the stop is disposed between the second lens unit L2 and the third lens unit L3 and moved independently from the second lens unit L2 and the third lens unit L3 upon changing the magnification.

Third Embodiment

The configurations of the first lens unit L1, the second lens unit L2, the third lens unit L3, and the fourth lens unit L4 are the same as those in the first embodiment.

In this embodiment, the stop is disposed between the second lens unit L2 and the third lens unit L3 and moved integrally with the third lens unit L3 upon changing the magnification.

Fourth Embodiment

The configurations of the first lens unit L1, the third lens unit L3, and the fourth lens unit L4 are the same as those in the first embodiment.

The second lens unit L2 includes a negative lens having a meniscus shape with the convex surface facing the object side, an optical element produced by forming a resin layer made of a high dispersion material on the image side of a biconcave negative lens, and a positive lens having a meniscus shape with the convex surface facing the object side.

The resin layer formed by applying resin on the negative lens functions as a positive lens having a meniscus shape with the convex surface facing the object side. Thus, this optical element may be used in the same manner as a cemented lens composed of a negative lens and a positive lens. The image side surface of the resin layer has an aspherical shape.

In this embodiment, the stop is disposed between the second lens unit L2 and the third lens unit L3 and moved integrally with the third lens unit L3 upon changing the magnification.

Fifth Embodiment

The configurations of the first lens unit L1, the third lens unit L3, and the fourth lens unit L4 are the same as those in the first embodiment.

The second lens unit L2 includes a negative lens having a meniscus shape with the convex surface facing the object side, a cemented lens composed of a positive lens with a convex surface facing the image side and a biconcave negative lens, and a positive lens having a meniscus shape with the convex surface facing the object side. The object side surface of the positive lens in the cemented lens has an aspherical shape.

In this embodiment, the stop is disposed between the second lens unit L2 and the third lens unit L3 and moved integrally with the third lens unit L3 upon changing the magnification.

Sixth Embodiment

The first lens unit L1 includes a positive lens having a convex surface facing the object side.

The configurations of the second lens unit L2, the third lens unit L3, and the fourth lens unit L4 are the same as those in the first embodiment.

In this embodiment, the stop is disposed between the second lens unit L2 and the third lens unit L3 and moved integrally with the third lens unit L3 upon changing the magnification.

In the first to sixth embodiments, the cemented lenses (especially the cemented lenses in the second lens unit L2) and the optical element produced by forming a resin layer on a surface of a lens may be collectively referred to as compound lenses. What is referred to by the term "compound lens" used in the description of the embodiments includes a lens produced by cementing lenses using an adhesive, an optical contact or other means and a lens produced by applying an resin layer having a refractive power (or optical power) on a lens. The members such as a lens and a resin layer that constitute such a compound lens are referred to as optical members.

As per the above, the zoom lenses according to the embodiments are constructed by a very small number of lenses all in all to make the size of the optical system small, while having excellent optical performance.

Among the lens units in each embodiment, the first lens unit having a positive refractive power has the largest effective diameter. The first lens unit L1 is constructed as a lens unit including one or two lenses. Thus, a compact optical system with a reduced number of lenses is provided.

When two lenses are used in the first lens unit L1, a positive lens and a negative lens are used to achieve achromatism. Specifically, magnification chromatic aberration is corrected satisfactorily throughout the zoom ranges from the wide angle end to the telephoto end and longitudinal chromatic aberration is corrected satisfactorily at the telephoto end.

The second lens unit L2 includes four lenses in three groups, whereby excellent aberration correction is achieved while maintaining a strong negative refractive power.

A zoom lens having a particularly high zoom ratio and high optical performance is made.

The third lens unit L3 having a positive refractive power plays a principal role in changing the magnification. The third lens unit L3 includes four lenses in three groups to correct various aberrations and has excellent optical performance accordingly.

In the fourth lens unit L4 having a positive refractive power, use is made of a lens having a relatively weak refractive power. The fourth lens unit L4 efficiently corrects off-axis aberrations and longitudinal aberrations that cannot be sufficiently corrected by the third lens unit L3.

A lens unit having a small refractive power or a converter lens unit may be provided on the object side of the first lens unit L1 and/or on the image side of the fourth lens unit L4.

As per the above, according to the embodiments disclosed herein, bright (or fast) lenses with zoom ratios in the range of approximately 5 to 7 having excellent optical performance are provided, while achieving a reduction in the number of the lenses and a reduction in the length of the entire zoom lens.

In the following, numerical embodiments of the present invention will be presented. In the following description of the numerical embodiments, suffix number i represents the surface number counted from the object side. Thus, Ri represents the radius of curvature of the i-th lens surface (or the i-th surface) and Di represents the distance between the i-th surface and the (i+1)-th surface. Ni represents the refractive index for the d-line and vi represents the Abbe number. The two surfaces closest to the image side are surfaces of the optical block G.

The aspherical shape is expressed by the following equation in terms of the height h from the optical axis and the displacement (or distance) in the direction parallel to the optical axis at that height h from the vertex of the aspherical surface as the reference point:

$$X=(h^2/R)/[1+\{1-(1+k)(h/R)^2\}^{1/2}]+Ah^2+Bh^4+Ch^8+Eh^{10},$$

where k is the conic constant, A, B, C, D and E are second, fourth, sixth, eighth and tenth order aspherical coefficients, and R is the paraxial radius of curvature.

In the following, the expression "e-OX" stands for "×10$^{-x}$", Fno represents the F-number and ω represents half the angle of field.

Values associated with the above mentioned conditional expressions in the respective numerical embodiments will be presented in Table 1. In Table 1, each of values is obtained by rounding off two place of decimals of actual value to nearest decimal point. That is, value of conditional expression (2) of the first embodiment is "1.8" for example, and that value means actual value exists within a range larger than "1.75" and smaller than "1.85".

Numerical Embodiment 1 f = 4.75-31.90 Fno = 2.88-5.65 2ω = 70.4°-12.0°

| R1 = 23.618 | D1 = 1.30 | N1 = 1.846660 | v1 = 23.9 |
| R2 = 15.826 | D2 = 5.70 | N2 = 1.772499 | v2 = 49.6 |
| R3 = 90.464 | D3 = variable | | |
| R4 = 47.869 | D4 = 1.30 | N3 = 1.834807 | v3 = 42.7 |
| R5 = 7.140 | D5 = 2.92 | | |
| R6 = 137.230 | D6 = 1.50 | N4 = 1.922860 | v4 = 18.9 |
| R7 = −34.127 | D7 = 0.70 | N5 = 1.848620 | v5 = 40.0 |
| *R8 = 7.857 | D8 = 1.72 | | |
| R9 = 11.022 | D9 = 1.80 | N6 = 1.846660 | v6 = 23.9 |
| R10 = 35.797 | D10 = variable | | |
| R11 = stop | D11 = 0.65 | | |
| *R12 = 7.825 | D12 = 2.00 | N7 = 1.519480 | v7 = 61.8 |
| R13 = −19.765 | D13 = 0.20 | | |
| R14 = 4.783 | D14 = 1.90 | N8 = 1.603112 | v8 = 60.6 |
| R15 = 12.765 | D15 = 0.60 | N9 = 2.003300 | v9 = 28.3 |
| R16 = 3.939 | D16 = 1.00 | | |
| R17 = 120.374 | D17 = 1.20 | N10 = 1.496999 | v10 = 81.5 |
| R18 = −17.614 | D18 = variable | | |
| R19 = 10.787 | D19 = 2.20 | N11 = 1.487490 | v11 = 70.2 |
| R20 = 205.979 | D20 = variable | | |
| R21 = ∞ | D21 = 1.20 | N12 = 1.516330 | v12 = 64.1 |
| R22 = ∞ | | | |

| variable | focal length | | |
| --- | --- | --- | --- |
| distance | 4.75 | 14.24 | 31.90 |
| D3 | 0.40 | 10.16 | 14.90 |
| D10 | 16.00 | 4.97 | 1.75 |
| D18 | 3.14 | 6.62 | 18.83 |
| D20 | 1.40 | 3.85 | 1.29 | aspherical coefficient

8th surface: k = −1.60081e−01, A = 0, B = −1.02036e−04, C = −2.30999e−06, D = −5.10885e−09, E = 0.00000e+00
12th surface: k = 6.82403e−01, A = 0, B = −5.94769e−04, C = −3.89309e−06, D = −2.93625e−07, E = 0.00000e+00

Numerical Embodiment 2 f = 4.74-31.90 Fno = 2.87-5.65 2ω = 70.5°-12.0°

| R1 = 25.085 | D1 = 1.30 | N1 = 1.846660 | v1 = 23.9 |
| R2 = 17.533 | D2 = 5.00 | N2 = 1.772499 | v2 = 49.6 |
| R3 = 70.640 | D3 = variable | | |
| R4 = 45.854 | D4 = 1.30 | N3 = 1.882997 | v3 = 40.8 |
| R5 = 7.685 | D5 = 2.59 | | |
| *R6 = 124.398 | D6 = 1.80 | N4 = 1.647689 | v4 = 33.8 |
| R7 = −43.191 | D7 = 1.00 | N5 = 1.848620 | v5 = 40.0 |
| R8 = 8.491 | D8 = 1.68 | | |
| R9 = 12.014 | D9 = 1.80 | N6 = 1.922860 | v6 = 18.9 |
| R10 = 46.856 | D10 = variable | | |
| R11 = stop | D11 = variable | | |
| *R12 = 7.107 | D12 = 2.00 | N7 = 1.519480 | v7 = 61.8 |
| R13 = −24.929 | D13 = 0.20 | | |
| R14 = 5.560 | D14 = 1.90 | N8 = 1.696797 | v8 = 55.5 |
| R15 = 20.250 | D15 = 0.60 | N9 = 2.003300 | v9 = 28.3 |
| R16 = 4.155 | D16 = variable | | |
| R17 = 26.808 | D17 = 1.20 | N10 = 1.487490 | v10 = 70.2 |
| R18 = −26.355 | D18 = variable | | |
| R19 = 11.461 | D19 = 2.20 | N11 = 1.487490 | v11 = 70.2 |
| R20 = 205.979 | D20 = variable | | |
| R21 = ∞ | D21 = 1.20 | N12 = 1.516330 | v12 = 64.1 |
| R22 = ∞ | | | |

| variable | focal length | | |
| --- | --- | --- | --- |
| distance | 4.74 | 14.18 | 31.90 |
| D3 | 0.40 | 10.57 | 18.79 |
| D10 | 13.48 | 2.40 | 1.37 |
| D16 | 1.50 | 1.50 | 1.50 |
| D18 | 3.26 | 6.51 | 19.00 |
| D20 | 1.40 | 5.10 | 1.56 |

-continued aspherical coefficient

6th surface: k = 3.92047e+02, A = 0, B = 1.13196e−04,
C = 2.36946e−06, D = −3.58200e−08, E = 0.00000e+00
12th surface: k = 3.54880e−01, A = 0, B = −5.13690e−04,
C = −3.34336e−06, D = −3.17651e−07, E = 0.00000e+00

Numerical Embodiment 3 f = 4.75–31.90 Fno = 2.88–5.65 2ω = 70.4°–12.0°

| | | | |
|---|---|---|---|
| R1 = 23.847 | D1 = 1.30 | N1 = 1.846660 | ν1 = 23.9 |
| R2 = 16.365 | D2 = 5.70 | N2 = 1.772499 | ν2 = 49.6 |
| R3 = 87.694 | D3 = variable | | |
| R4 = 36.878 | D4 = 1.30 | N3 = 1.882997 | ν3 = 40.8 |
| R5 = 7.138 | D5 = 2.90 | | |
| R6 = 453.115 | D6 = 1.50 | N4 = 1.647689 | ν4 = 33.8 |
| R7 = −26.002 | D7 = 0.70 | N5 = 1.848620 | ν5 = 40.0 |
| *R8 = 8.598 | D8 = 1.55 | | |
| R9 = 12.014 | D9 = 1.80 | N6 = 1.922860 | ν6 = 18.9 |
| R10 = 49.439 | D10 = variable | | |
| R11 = stop | D11 = 0.65 | | |
| *R12 = 7.847 | D12 = 2.00 | N7 = 1.519480 | ν7 = 61.8 |
| R13 = −19.934 | D13 = 0.20 | | |
| R14 = 4.810 | D14 = 1.90 | N8 = 1.603112 | ν8 = 60.6 |
| R15 = 14.536 | D15 = 0.60 | N9 = 2.003300 | ν9 = 28.3 |
| R16 = 4.005 | D16 = 1.00 | | |
| R17 = 77.283 | D17 = 1.20 | N10 = 1.496999 | ν10 = 81.5 |
| R18 = −17.402 | D18 = variable | | |
| R19 = 11.157 | D19 = 2.20 | N11 = 1.487490 | ν11 = 70.2 |
| R20 = 205.979 | D20 = variable | | |
| R21 = ∞ | D21 = 1.20 | N12 = 1.516330 | ν12 = 64.1 |
| R22 = ∞ | | | |

| variable | focal length | | |
|---|---|---|---|
| distance | 4.75 | 14.31 | 31.90 |
| D3 | 0.40 | 10.03 | 15.18 |
| D10 | 16.07 | 4.67 | 1.65 |
| D18 | 3.26 | 6.43 | 18.82 |
| D20 | 1.40 | 4.34 | 1.69 | aspherical coefficient

8th surface: k = 2.26768e−01, A = 0, B = −1.47047e−04,
C = −2.61661e−06, D = −7.07895e−09, E = 0.00000e+00
12th surface: k = 6.61619e−01, A = 0, B = −5.77307e−04,
C = −3.45517e−06, D = −2.71820e−07, E = 0.00000e+00

Numerical Embodiment 4 f = 4.75–31.90 Fno = 2.76–5.05 2ω = 70.4°–12.0°

| | | | |
|---|---|---|---|
| R1 = 25.549 | D1 = 1.30 | N1 = 1.846660 | ν1 = 23.9 |
| R2 = 16.876 | D2 = 5.20 | N2 = 1.772499 | ν2 = 49.6 |
| R3 = 117.826 | D3 = variable | | |
| R4 = 28.203 | D4 = 0.90 | N3 = 1.882997 | ν3 = 40.8 |
| R5 = 6.613 | D5 = 3.51 | | |
| R6 = −33.688 | D6 = 0.70 | N4 = 1.834807 | ν4 = 42.7 |
| R7 = 10.601 | D7 = 1.00 | N5 = 1.625200 | ν5 = 24.4 |
| *R8 = 19.810 | D8 = 0.88 | | |
| R9 = 12.014 | D9 = 1.60 | N6 = 1.922860 | ν6 = 18.9 |
| R10 = 28.372 | D10 = variable | | |
| R11 = stop | D11 = 0.65 | | |
| *R12 = 10.488 | D12 = 2.00 | N7 = 1.583126 | ν7 = 59.4 |
| R13 = −17.387 | D13 = 0.20 | | |
| R14 = 4.745 | D14 = 1.90 | N8 = 1.603112 | ν8 = 60.6 |
| R15 = 9.910 | D15 = 0.60 | N9 = 1.846660 | ν9 = 23.9 |
| R16 = 3.784 | D16 = 1.00 | | |
| R17 = −34.112 | D17 = 1.20 | N10 = 1.487490 | ν10 = 70.2 |
| R18 = −18.870 | D18 = variable | | |
| R19 = 11.192 | D19 = 2.20 | N11 = 1.589130 | ν11 = 61.1 |
| R20 = 248.925 | D20 = variable | | |
| R21 = ∞ | D21 = 1.20 | N12 = 1.516330 | ν12 = 64.1 |
| R22 = ∞ | | | |

| variable | focal length | | |
|---|---|---|---|
| distance | 4.75 | 14.26 | 31.90 |
| D3 | 0.40 | 10.45 | 16.83 |
| D10 | 16.25 | 4.31 | 1.78 |
| D18 | 3.74 | 6.22 | 17.57 |
| D20 | 1.40 | 4.74 | 2.17 | aspherical coefficient

8th surface: k = 8.48623e+00, A = 0, B = −5.26102e−05,
C = 2.18271e−07, D = −4.17485e−08, E = 0.00000e+00
12th surface: k = 3.33879e+00, A = 0, B = −6.77299e−04,
C = −6.26025e−06, D = −5.51804e−07, E = 0.00000e+00

Numerical Embodiment 5 f = 4.75–31.90 Fno = 2.88–5.65 2ω = 70.4°–12.0°

| | | | |
|---|---|---|---|
| R1 = 23.711 | D1 = 1.30 | N1 = 1.846660 | ν1 = 23.9 |
| R2 = 16.095 | D2 = 5.20 | N2 = 1.772499 | ν2 = 49.6 |
| R3 = 88.741 | D3 = variable | | |
| R4 = 32.443 | D4 = 1.00 | N3 = 1.882997 | ν3 = 40.8 |
| R5 = 7.230 | D5 = 2.93 | | |
| *R6 = 3547.730 | D6 = 1.80 | N4 = 1.683290 | ν4 = 31.4 |
| R7 = −20.334 | D7 = 0.70 | N5 = 1.882997 | ν5 = 40.8 |
| R8 = 9.470 | D8 = 1.58 | | |
| R9 = 12.014 | D9 = 1.60 | N6 = 1.922860 | ν6 = 18.9 |
| R10 = 40.442 | D10 = variable | | |
| R11 = stop | D11 = 0.65 | | |
| *R12 = 8.219 | D12 = 2.00 | N7 = 1.519480 | ν7 = 61.8 |
| R13 = −19.011 | D13 = 0.20 | | |
| R14 = 4.774 | D14 = 1.90 | N8 = 1.603112 | ν8 = 60.6 |
| R15 = 13.677 | D15 = 0.60 | N9 = 2.003300 | ν9 = 28.3 |
| R16 = 4.005 | D16 = 1.00 | | |
| R17 = 47.700 | D17 = 1.20 | N10 = 1.487490 | ν10 = 70.2 |
| R18 = −20.506 | D18 = variable | | |
| R19 = 11.389 | D19 = 2.20 | N11 = 1.487490 | ν11 = 70.2 |
| R20 = 205.979 | D20 = variable | | |
| R21 = ∞ | D21 = 1.20 | N12 = 1.516330 | ν12 = 64.1 |
| R22 = ∞ | | | |

| variable | focal length | | |
|---|---|---|---|
| distance | 4.75 | 14.25 | 31.90 |
| D3 | 0.40 | 10.04 | 15.28 |
| D10 | 16.38 | 4.96 | 1.87 |
| D18 | 3.58 | 6.72 | 19.02 |
| D20 | 1.40 | 4.41 | 1.80 | aspherical coefficient

6th surface: k = −4.72857e+05, A = 0, B = 3.23121e−05,
C = 8.73178e−07, D = −1.22699e−08, E = 0.00000e+00
12th surface: k = 1.00867e+00, A = 0, B = −6.08605e−04,
C = −4.83888e−06, D = −2.83655e−07, E = 0.00000e+00

Numerical Embodiment 6 f = 4.66-23.00 Fno = 2.88-5.51 2ω = 71.4°-16.6°

| | | | |
|---|---|---|---|
| R1 = 30.955 | D1 = 3.00 | N1 = 1.842730 | v1 = 53.9 |
| R2 = 250.085 | D2 = variable | | |
| R3 = 56.139 | D3 = 1.30 | N2 = 1.882997 | v2 = 40.8 |
| R4 = 7.129 | D4 = 2.13 | | |
| R5 = 33.556 | D5 = 1.50 | N3 = 1.647689 | v3 = 33.8 |
| R6 = −71.256 | D6 = 0.70 | N4 = 1.848620 | v4 = 40.0 |
| *R7 = 7.507 | D7 = 2.00 | | |
| R8 = 12.014 | D8 = 1.80 | N5 = 1.922860 | v5 = 18.9 |
| R9 = 39.425 | D9 = variable | | |
| R10 = stop | D10 = 0.65 | | |
| *R11 = 9.482 | D11 = 2.00 | N6 = 1.519480 | v6 = 61.8 |
| R12 = −15.956 | D12 = 0.20 | | |
| R13 = 4.684 | D13 = 1.90 | N7 = 1.603112 | v7 = 60.6 |
| R14 = 17.008 | D14 = 0.60 | N8 = 2.003300 | v8 = 28.3 |
| R15 = 4.097 | D15 = 1.00 | | |
| R16 = 48.553 | D16 = 1.20 | N9 = 1.496999 | v9 = 81.5 |
| R17 = −20.043 | D17 = variable | | |
| R18 = 9.822 | D18 = 2.50 | N10 = 1.581439 | v10 = 40.8 |
| R19 = 241.072 | D19 = variable | | |
| R20 = ∞ | D20 = 1.20 | N11 = 1.516330 | v11 = 64.1 |
| R21 = ∞ | | | |

| variable | focal length | | |
|---|---|---|---|
| distance | 4.66 | 10.56 | 23.00 |
| D2 | 0.40 | 5.87 | 12.35 |
| D9 | 14.50 | 5.07 | 1.74 |
| D17 | 6.54 | 11.60 | 23.12 |
| D19 | 1.40 | 3.54 | 3.29 | aspherical coefficient

7th surface: k = 6.73267e−01, A = 0, B = −5.03694e−04,
C = −1.73695e−06, D = −4.32520e−07, E = 0.00000e+00
11th surface: k = 1.00203e−01, A = 0, B = −3.56058e−04,
C = 2.11171e−06, D = −2.52600e−07, E = 0.00000e+00

TABLE 1

| conditional expression | embodiment | | | | | |
|---|---|---|---|---|---|---|
| | 1 | 2 | 3 | 4 | 5 | 6 |
| (1) | 1.1 | 1.1 | 1.0 | 0.3 | 1.0 | 1.6 |
| (2) | 1.8 | 1.9 | 1.9 | 1.9 | 1.9 | 1.9 |
| (3) | 1.9 | 1.8 | 1.8 | 1.8 | 1.8 | 1.8 |
| (4) | 1.3 | 1.1 | 1.3 | 1.3 | 1.3 | 1.4 |
| (5) | 21.1 | 6.2 | 6.2 | 20.0 | 9.3 | 6.2 |

In the following, an embodiment of a digital still camera equipped with a zoom lens like those according to the first to sixth embodiments will be described with reference to FIG. 13.

The camera has a camera body 20 and a taking optical system 21 constructed as a zoom lens according to any one of the first to sixth embodiments. The camera also has a solid state image pickup element (or photoelectric conversion element) such as a CCD sensor or a CMOS sensor provided inside the camera body, which receives an object image formed by the taking optical system 21, a memory 23 for storing data of the object image obtained through photoelectric conversion by the solid state image pickup element 22, and a viewfinder 24 such as a liquid crystal display panel, which allows the user to view the object image formed on the solid state image pickup element 22.

As per the above, by applying the zoom lens according to the present invention to an image pickup apparatus such as a digital still camera, an image pickup apparatus that is compact in size and has excellent optical performance can be provided.

According to the embodiments described above, a zoom lens having a high zoom ratio and excellent optical performance throughout the entire zoom range in spite of its simple and compact lens configuration and an image pickup apparatus equipped with such a zoom lens can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No.2006-094283, filed Mar. 30, 2006, which is hereby incorporated by reference herein in its entirety.

What is claimed is:

1. A zoom lens comprising, from an object side to an image side:

a first lens unit having a positive refractive power;
a second lens unit having a negative refractive power;
a third lens unit having a positive refractive power; and
a fourth lens unit having a positive refractive power,
wherein the position of the first lens unit at the telephoto end is closer to the object side than the position of the first lens unit at the wide angle end,
the lens units move in such a way that the distance between the first lens unit and the second lens unit at the telephoto end is larger than the distance between the first lens unit and the second lens unit at the wide angle end, the distance between the second lens unit and the third lens unit at the telephoto end is smaller than the distance between the second lens unit and the third lens unit at the wide angle end, and the distance between the third lens unit and the fourth lens unit at the telephoto end is larger than the distance between the third lens unit and the fourth lens unit at the wide angle end,
the first lens unit includes two or less lenses including a positive lens, and
the second lens unit includes, from the object side to the image side, a negative lens, a compound lens including two optical members having refractive powers of opposite signs, and a positive lens.

2. A zoom lens according to claim 1, wherein the first lens unit consists of a positive lens and a negative lens, and the second lens unit consists of, in the mentioned order from the object side to the image side, a negative lens and a cemented lens including two lenses having refractive powers of opposite signs, and a positive lens.

3. A zoom lens according to claim 1, wherein the compound lens comprises a negative lens and a positive lens in the form of a resin layer formed on a light transmitting surface of that negative lens.

4. A zoom lens according to claim 1, satisfying the following condition:

$$0.1 < (R41+R52)/(R41-R52) < 1.7$$

where R41 is the radius of curvature of the object side surface of the compound lens, and R52 is the radius of curvature of the image side surface of the compound lens.

5. A zoom lens according to claim 1, satisfying the following condition:

$$1.75 < N2n < 2.0$$

$$1.65 < N2p < 2.0$$

where N2n is the average refractive index of the material of which the negative lens in the second lens unit is made, and N2p is the average refractive index of the material of which the positive lens in the second lens unit is made.

6. A zoom lens according to claim 1, further comprising an aperture stop disposed on the image side of the second lens unit, and satisfying the following condition:

$$0.9 < d2/\sqrt{(fw \cdot ft)} < 1.6$$

$$4 < v2sn - v2sp < 30$$

where d2 is the distance, along the optical axis, from the rear end of the second lens unit to the aperture stop at the wide angle end, v2sn and v2sp are, respectively, the Abbe numbers of the materials of which a negative lens and a positive lens in the compound lens are respectively made, and fw and ft are the focal lengths of the entire system at the wide angle end and at the telephoto end respectively.

7. A zoom lens according to claim 1, wherein the third lens unit consists of, from the object side to the image side, a positive lens having a biconvex shape, a compound lens in which a positive lens having a convex surface facing the object side and a negative lens having a concave surface facing the image side are compounded, and a positive lens.

8. A zoom lens according to claim 1, wherein said fourth lens unit consists of a single positive lens.

9. A zoom lens according to claim 1, wherein the zoom lens forms an image on an image pickup element.

10. An image pickup apparatus comprising:
an image pickup element; and
a zoom lens forming an image on the image pickup element,
wherein the zoom lens comprising from an object side to an image side:
a first lens unit having a positive refractive power;
a second lens unit having a negative refractive power;
a third lens unit having a positive refractive power; and
a fourth lens unit having a positive refractive power,
wherein the position of the first lens unit at the telephoto end is closer to the object side than the position of the first lens unit at the wide angle end,
the lens units move in such a way that the distance between the first lens unit and the second lens unit at the telephoto end is larger than the distance between the first lens unit and the second lens unit at the wide angle end, the distance between the second lens unit and the third lens unit at the telephoto end is smaller than the distance between the second lens unit and the third lens unit at the wide angle end, and the distance between the third lens unit and the fourth lens unit at the telephoto end is larger than the distance between the third lens unit and the fourth lens unit at the wide angle end,
the first lens unit includes two or less lenses including a positive lens, and
the second lens unit includes, from the object side to the image side, a negative lens, a compound lens including two optical members having refractive powers of opposite signs, and a positive lens.

* * * * *